United States Patent

Hasegawa et al.

[11] Patent Number: 6,130,667
[45] Date of Patent: Oct. 10, 2000

[54] CHARACTER PATTERN GENERATING APPARATUS

[75] Inventors: Susumu Hasegawa, Sakai; Hajime Watanabe; Yoshimi Asai, both of Osaka, all of Japan

[73] Assignee: Sharp Kabushiki Kaisha, Osaka, Japan

[21] Appl. No.: 08/907,051

[22] Filed: Aug. 6, 1997

[30] Foreign Application Priority Data

Aug. 23, 1996 [JP] Japan ................................. 8-222473

[51] Int. Cl.⁷ .................................................. G09G 5/24
[52] U.S. Cl. ........................ 345/194; 345/141; 345/467; 345/470
[58] Field of Search ................................. 345/194, 141, 345/467, 468, 471, 470

[56] References Cited

U.S. PATENT DOCUMENTS

| | | | |
|---|---|---|---|
| 4,748,443 | 5/1988 | Uehara et al. | 340/751 |
| 4,897,638 | 1/1990 | Kokunishi et al. | 340/751 |
| 4,931,953 | 6/1990 | Uehara et al. | 340/739 |
| 5,398,311 | 3/1995 | Seto | 345/143 |
| 5,850,228 | 12/1998 | Hasegawa et al. | 345/471 |
| 5,867,172 | 2/1999 | Fujisawa et al. | 345/467 |
| 5,870,107 | 2/1999 | Fujisawa et al. | 345/194 |
| 5,920,324 | 7/1999 | Hasegawa et al. | 345/467 |
| 5,940,084 | 8/1999 | Motokado et al. | 345/468 |

*Primary Examiner*—Richard A. Hjerpe
*Assistant Examiner*—Ronald Laneau

[57] ABSTRACT

A character pattern generating apparatus includes a CPU and a memory for pre-storing character shape skeleton data, element skeleton shape data, element skeleton shape data, and element outline shape data. The CPU determines whether a thickness of a character is to be altered or not from a standard thickness, and determines whether the process of altering the thickness of each constituent element in the element outline shape data is to be performed by calculation, or by replacing the element with an alternative element in the case where character thickness is to be altered. The CPU then alters the thickness in the element outline shape data according to the determination and deforms the element skeleton shape data based on the character shape skeleton data. Associated therewith, the CPU alters the element outline shape data based on the altered element skeleton shape data and generates a character pattern from the altered element outline shape data.

20 Claims, 25 Drawing Sheets

CHARACTER CODE
1616 (旭)
CHARACTER STYLE CODE
01 (MING-TYPE)

CHARACTER PATTERN GENERATING APPARATUS

BACKGROUND OF THE INVENTION

1. Field of the Invention

The present invention relates to a character pattern generating apparatus. More particularly, the present invention relates to a character pattern generating apparatus having characters in an outline font and generating various character patterns with different stroke thicknesses.

2. Description of the Related Arts

Examples of the above character pattern generating apparatus include one for generating characters with thick character patterns or thin character patterns. Such a character generating apparatus is disclosed, for example, in Japanese Laid-open Patent Publication (Kokai) No. Hei 4(1992)-24689, in which a series of points constituting the outline of the character are shifted by a predetermined length toward the inside or outside of the outline in a direction perpendicular to the gradient of the outline at each of the points.

Also, Japanese Laid-open Patent Publication (Kokai) No. Hei 4(1992)-136898 discloses a method characterized by adding to the data approximating the outline of the character with a line/curve an attribute corresponding to the state of the approximating line/curve and by altering the line width of the stroke and partially changing the outline shape through utilizing the added attribute.

However, according to the above methods disclosed in Japanese Laid-open Patent Publication (Kokai) No. Hei 4(1992)-24689 or Japanese Laid-open Patent Publication (Kokai) No. Hei 4(1992)-136898, a complicated procedure including calculation of angles is required in transferring each of the outline points, leading to large amount of calculation. Moreover, since the amount of shift is constant, thick portions or thin portions of the stroke originally present in the designed characters become monotonous, thus deteriorating the quality. In addition, it is necessary to add deformation correction data such as the direction and the amount of shift for each of the outline points, so that the number of steps for adding the data and the amount of font data will be large.

Further, a conventional character pattern generating apparatus such as disclosed in Japanese Examined Patent Publication (Kokoku) No. Hei 8(1996)-12544 stores data on character shape described in line figure showing skeleton of character figure and outline shape of fundamental elements constituting the character style of the character figure as a plurality of parameters, and generates a character figure by modifying and combining the shape of the constituent element for each character kind based on the data of the character shape.

However, this method of storing the data of the shape of the constituent element as a plurality of element parameters forming the outline needs a professional knowledge of the element parameters and the registration operations in order to design and register these parameters. Therefore, it was difficult for those without the professional knowledge of character style designer, for example to modify these constituent elements.

Also, in these methods, numerous modifications were needed on the shapes such as bent portions or squamiform (scale-like) portions of the characters so as to maintain the quality of the characters in a character style.

SUMMARY OF THE INVENTION

The present invention has been made in view of these circumstances and the purpose thereof is to provide a character pattern generating apparatus for generating a higher quality font in which the number of steps for preparing data and the amount of data required for generating thick character patterns or thin character patterns are reduced and the amount of calculation is reduced. Further, the present invention provides a character pattern generating apparatus for generating numerous kinds of high quality font having no design restrictions with smaller number of steps.

Accordingly, the present invention is to provide a character pattern generating apparatus comprising: a memory for storing, in advance, character shape skeleton data representing skeleton shapes of characters, element skeleton shape data having a set of skeleton shapes of character elements constituting the characters for each character style, and element outline shape data having a set of outline shapes of character elements constituting the characters for each character style; thickness determining means for determining whether a thickness of a character is to be altered or not from a standard thickness; thickness alteration process determining means for determining whether the process of altering the thickness of each constituent element in the element outline shape data is to be performed by calculation or by replacing the element with an alternative element if the thickness of the character is to be altered; element outline thickness altering means for altering the thickness in the element outline shape data in accordance with the determination of the thickness alteration process determining means; element skeleton shape/element outline shape altering means for altering the element skeleton shape data in accordance with the character shape skeleton data and for altering, in association therewith, the element outline shape data in accordance with the altered element skeleton shape data; and generating means for generating a character pattern by using the altered element outline shape data.

In accordance with the present invention, the thickness alteration process determining means determines whether the process of altering the thickness is to be performed by calculation or by replacing the element with an alternative element if the thickness of the character is to be altered. The element outline thickness altering means alters the thickness of each constituent element in the element outline shape data in accordance with the determination of the thickness alteration process determining means. Therefore, the shape of each element can be altered in the most suitable method depending on the element. For example, if the quality of a character become deteriorated when the thickness of the character is altered by calculation, an alternative element may be prepared for replacement. This makes it possible to generate a thick or thin character pattern having an extremely high quality with a comparatively small capacity.

DETAILED DESCRIPTION OF THE PREFERRED EMBODIMENTS

Figure 1:
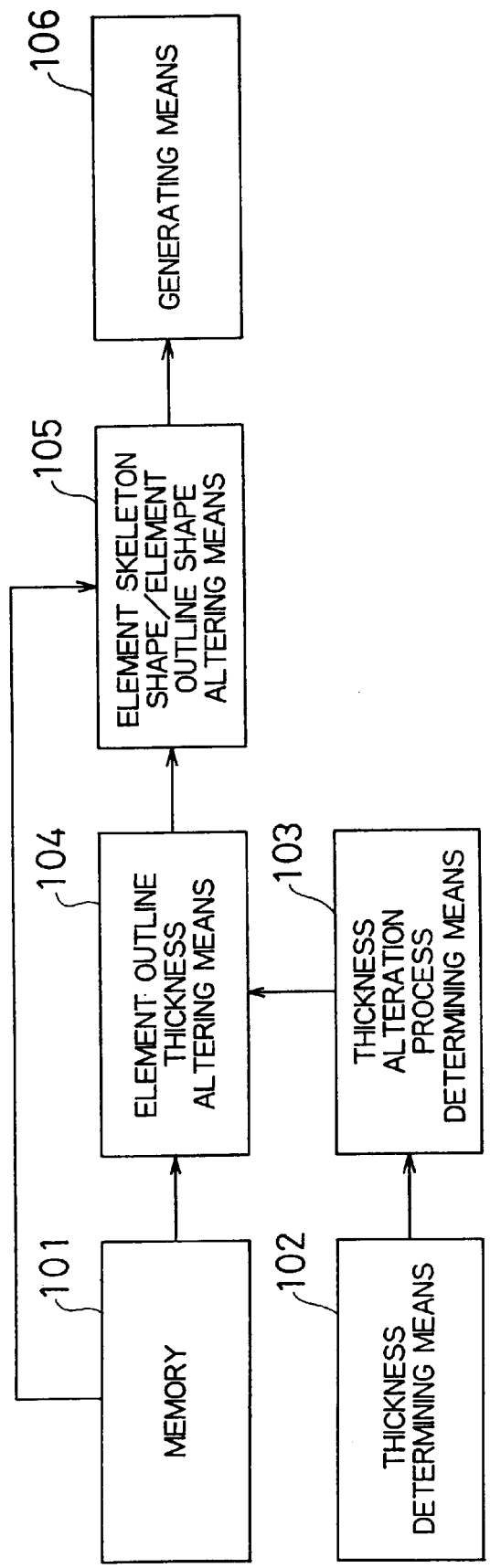
FIG. 1 is a block diagram for showing a construction of the invention.

The construction of the present invention is shown in FIG. 1. In the present invention, a microprocessor including a ROM, a RAM, and an I/O port is conveniently used for the thickness determining means 102, the thickness alteration process determining means 103, the element outline thickness altering means 104, the element skeleton shape/element outline shape altering means 105, and the generating means 106. As the memory 101, a ROM is usually used.

In the above-described construction of the present invention, the determination of the thickness determining means 102 may be performed in accordance with the instruction of the user.

The memory 101 preferably stores the character shape skeleton data, the element skeleton shape data, and the element outline shape data in advance so that the character shape skeleton data include (a) element pasting data for indicating the element outline shape data corresponding to the constituent elements and (b) thickness alteration process determining data required for determination of the process for altering the thickness of the constituent elements.

Also, the memory 101 preferably stores the character shape skeleton data, the element skeleton shape data, and the element outline shape data in advance so that the element outline shape data for one character style include thickness alteration attribute data required for the process of altering the thickness of the element outline.

Further, the memory 101 preferably stores the character shape skeleton data, the element skeleton shape data, and the element outline shape data in advance so that the element outline shape data for one character style include element outline shape alteration data required for altering the element outline shape.

Also, the memory 101 preferably stores the character shape skeleton data, the element skeleton shape data, and the element outline shape data in advance after subjecting each of the skeleton points in the element skeleton shape data to coordinate transformation to make the Y coordinate zero and altering the element outline shape data in association therewith.

The element outline thickness altering means 104 preferably alters the thickness of the element outline shape after determining, in accordance with the thickness alteration attribute data, whether (a) the X coordinate is fixed and the Y coordinate alone is transferred or (b) both of the X and Y coordinates are fixed for each of the outline points in the element outline shape data.

Another aspect of the present invention is to provide a character pattern generating apparatus comprising: a memory for storing, in advance, character shape skeleton data representing skeleton shapes of characters, element skeleton shape data having a set of skeleton shapes of character elements constituting the characters for each character style, and element outline shape data having a set of outline shapes of character elements constituting the characters for each character style; an element skeleton shape altering means for altering the element skeleton shape data in accordance with the character shape skeleton data; an alteration procedure determining means for determining a condition of transferring outline points; an element outline shape altering means for transferring each of the outline points in the element outline shape data in accordance with the condition of transferring outline points as determined by the alteration procedure determining means; and a generating means for generating a character pattern by using the altered element outline shape data.

According to this aspect of the invention, a microprocessor including a ROM, a RAM, and an I/O port is conveniently used for the element skeleton shape altering means, the alteration procedure determining means, the element outline shape altering means, and the generating means. As the memory, a ROM is usually used.

According to this aspect of the invention, the element skeleton shape altering means alters the element skeleton shape data in accordance with the character shape skeleton data; the alteration procedure determining means then determines the condition of transferring the outline points; and the element outline shape altering means transfers each of the outline points in the element outline shape data in accordance with the condition of transferring outline points as determined by the alteration procedure determining means. Therefore, each of the outline points in the element outline shape data can be transferred by the most suitable method depending on the outline shape of the constituent element. This makes it possible to generate a character pattern having a high quality.

In the above-described construction according to this aspect of the invention, the element outline shape altering means preferably transfers an outline point in the element outline shape data by fixing the distance between the outline point to be transferred and the corresponding skeleton line and by enlarging or diminishing the distance between the foot of a perpendicular and the skeleton point in accordance with the alteration of the element skeleton, the perpendicular being a line drawn perpendicular to the skeleton line from the outline point to be transferred.

Also, the element outline shape altering means preferably transfers an outline point in the element outline shape data by fixing the distance between the outline point to be transferred and the corresponding skeleton line and by fixing the distance between the foot of a perpendicular and the skeleton point, the perpendicular being a line drawn perpendicular to the skeleton line from the outline point to be transferred.

Further, the element outline shape altering means preferably transfers an outline point in the element outline shape data by fixing the distance and the angle between the outline point and the skeleton point.

EXAMPLES

These and other objects of the present invention will become more readily apparent from the detailed description of the embodiments 1 and 2 given hereafter in conjunction with the accompanying drawings. However, these embodiments and drawings are given by way of illustration only and are not to be construed as being intended to limit the scope of the present invention, since various changes and modifications will become apparent to those skilled in the art from the detailed description.

The character pattern generating apparatus according to the present invention may be usually used by in a Japanese language word processor or a personal computer. However, the character pattern generating apparatus according to the present invention may be applied to any kind of character as long as each character consists of a plurality of elements. For example, the character pattern generating apparatus may be applied to English letters, Chinese characters, Hankul (Korean) characters, and the like. In such a case, the character pattern generating apparatus according to the present invention may be incorporated into an English language word processor, a Chinese language word processor, a Korean language word processor, or the like.

Embodiment 1

Figure 2:
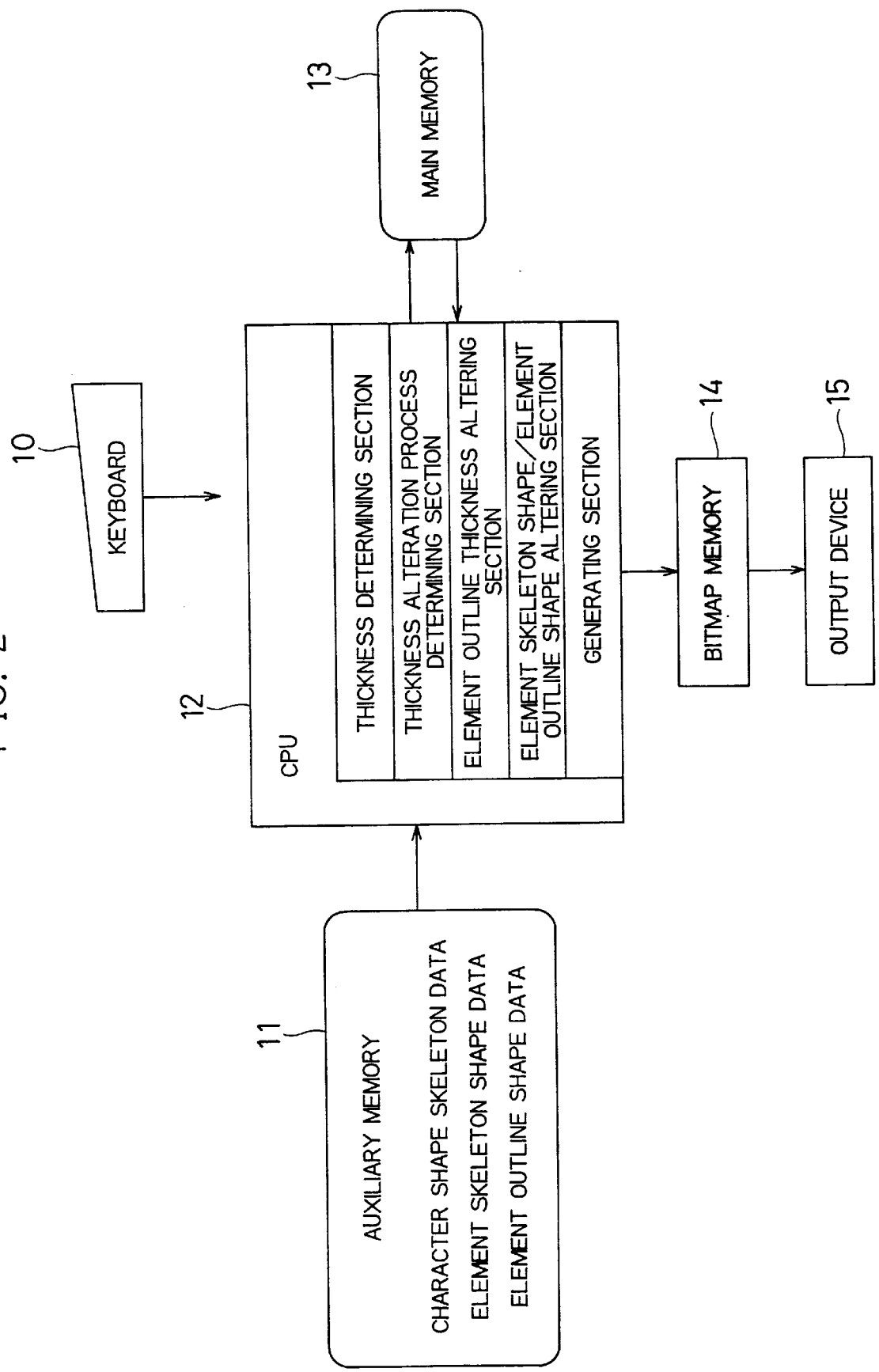
FIG. 2 is a block diagram for showing a schematic construction of a character pattern generating apparatus according to embodiment 1 of the present invention.

FIG. 2 is a block diagram showing a schematic construction of a character pattern generating apparatus according to embodiment 1 of the present invention. Referring to FIG. 2, the character pattern generating apparatus comprises a key board 10, an auxiliary memory 11, a CPU 12, a main memory 13, a bit map memory 14, and an output device 15 including a laser printer, a thermal printer, or the like.

The key board 10 is used for inputting the character code showing a character to be generated and a character style code. The auxiliary memory 11 stores, in advance, the character shape skeleton data representing the shapes of the characters, element skeleton shape data representing the skeleton shapes of constituent elements forming each of the characters, and element outline shape data representing the outline shapes of constituent elements forming each of the characters.

The CPU 12 includes a thickness determining section for determining whether the thickness of a character is to be altered or not from the designated character style code; a thickness alteration process determining section for determining whether the process of altering the thickness of each constituent element is to be performed by calculation or by replacing the element with an alternative element; an element outline thickness altering section for altering the thickness of the outline shape; an element skeleton shape/element outline shape altering section for altering the element skeleton shape and the element outline shape in accordance with the skeleton shape of the character; and a generating section for generating a character pattern.

Also, the CPU 12 comprises a memory for programs and a memory for work area for performing a control operation to generate character patterns based on each of the data in the auxiliary memory 11 and the main memory 13. These character patterns are expanded into bit map data on the bit map memory 14 and are outputted by printing via the output device 15 such as a laser printer or a thermal printer.

The main memory 13 comprises an input buffer for temporarily storing the character data read out from the auxiliary memory 11, an output buffer for temporarily storing the element outline shape data representing the altered shapes, and a memory portion for storing the element outline shape data representing the altered thickness.

The outline shape of a character is stored by employing, for example, (1) a method of storing the outline of the character by line approximation, (2) a method of storing the outline of the character by lines and circular arcs, (3) a method of storing the outline of the character by lines and curves. Among these methods, the method (3) is the most suitable for generating the character patterns considering the character quality, the efficiency of data volume, and others. In view of this, the outlines of each of the characters are stored by employing the above method (3) in this embodiment. Thus, the outline data of the characters stored by lines and curves are stored in the auxiliary memory 11 as coordinate data of outline points in the element outline shape data.

Figure 3:
FIG. 3 is an explanatory view for showing an example of the contents stored in the character shape skeleton data according to embodiment 1 of the present invention.

Next, the contents stored in the auxiliary memory 11 are now explained. FIG. 3 is an explanatory view showing an example of stored character shape skeleton data. The character shape skeleton data include character codes 30 for differentiating character kinds, the number 31 of character styles generated from one character shape skeleton data, and the number 32 of elements constituting the character shape. Also, element pasting data and thickness altering process determining data are stored for every character style code and for every constituent element.

The element pasting data are stored by the number of character-constituting elements multiplied by the number of generated character styles. The element pasting data comprise an element code 35 for indicating the element outline shape corresponding to the constituent element, a number 36 of skeleton points forming the constituent element, and a pointer 37 pointing to the skeleton point coordinate data.

After the group of element pasting data, the thickness alteration process determining data are subsequently stored. These thickness alteration process determining data are stored by the number of character-constituting elements multiplied by the number of generated character styles. The thickness alteration process determining data comprise (a) a thick element replacement determining code 60 for indicating whether the process of replacing the constituent element with an alternative element should be carried out or not if the character is to be made thicker, (b) a thin element replacement determining code 61 for indicating whether the process of replacing the constituent element with an alternative element should be carried out or not if the character is to be made thinner, (c) a thick alternative element code 62 used for altering the element code in carrying out the element replacement process, and (d) a thin alternative element code 63 used for altering the element code in carrying out the element replacement process.

Figure 4:
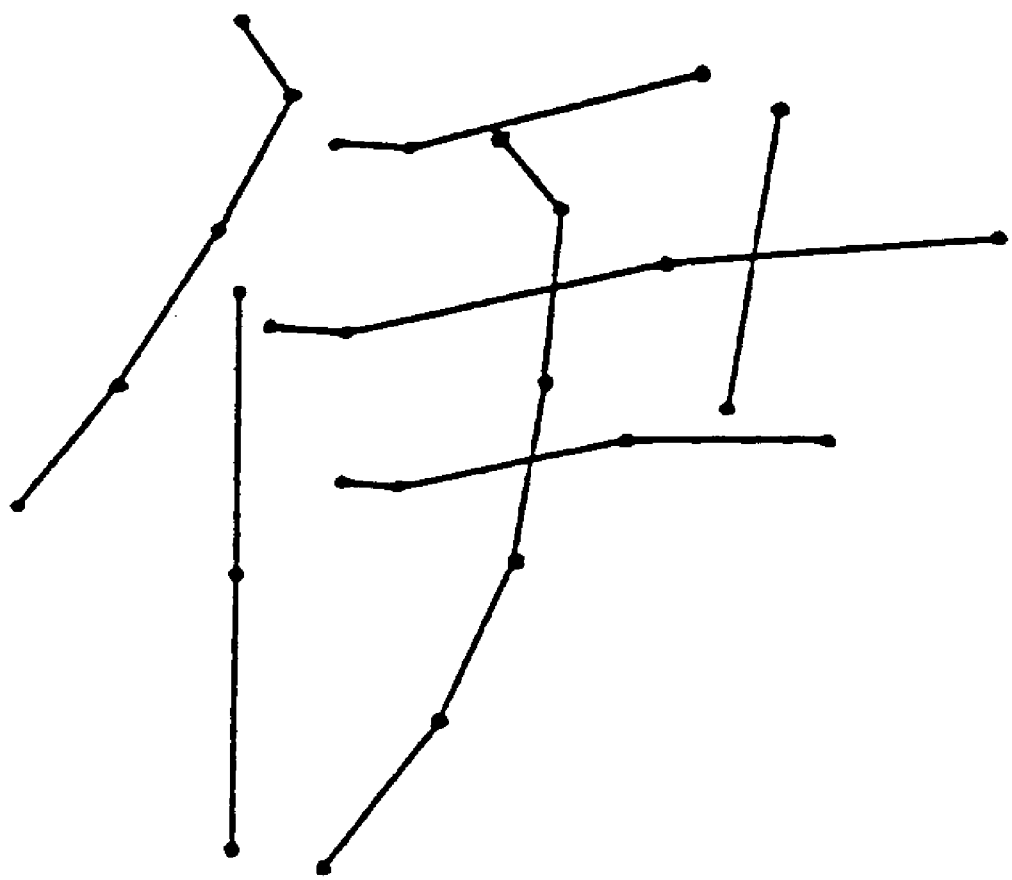
FIG. 4 is an explanatory view for showing an example of geometric information in the character shape skeleton data for one character according to embodiment 1 of the present invention.

After the group of thickness alteration process determining data, the skeleton point coordinate data are subsequently stored. These skeleton point coordinate data are stored in such a manner that the group of the skeleton point coordinate data 39 of constituent elements follows the number 38 of skeleton points of the character. FIG. 4 shows an example of geometric information in character shape skeleton data for one character inputted from the keyboard 10. In this example, the character code No. 1643 "伊" is designated according to JIS section point (Kuten) code.

Figure 5:
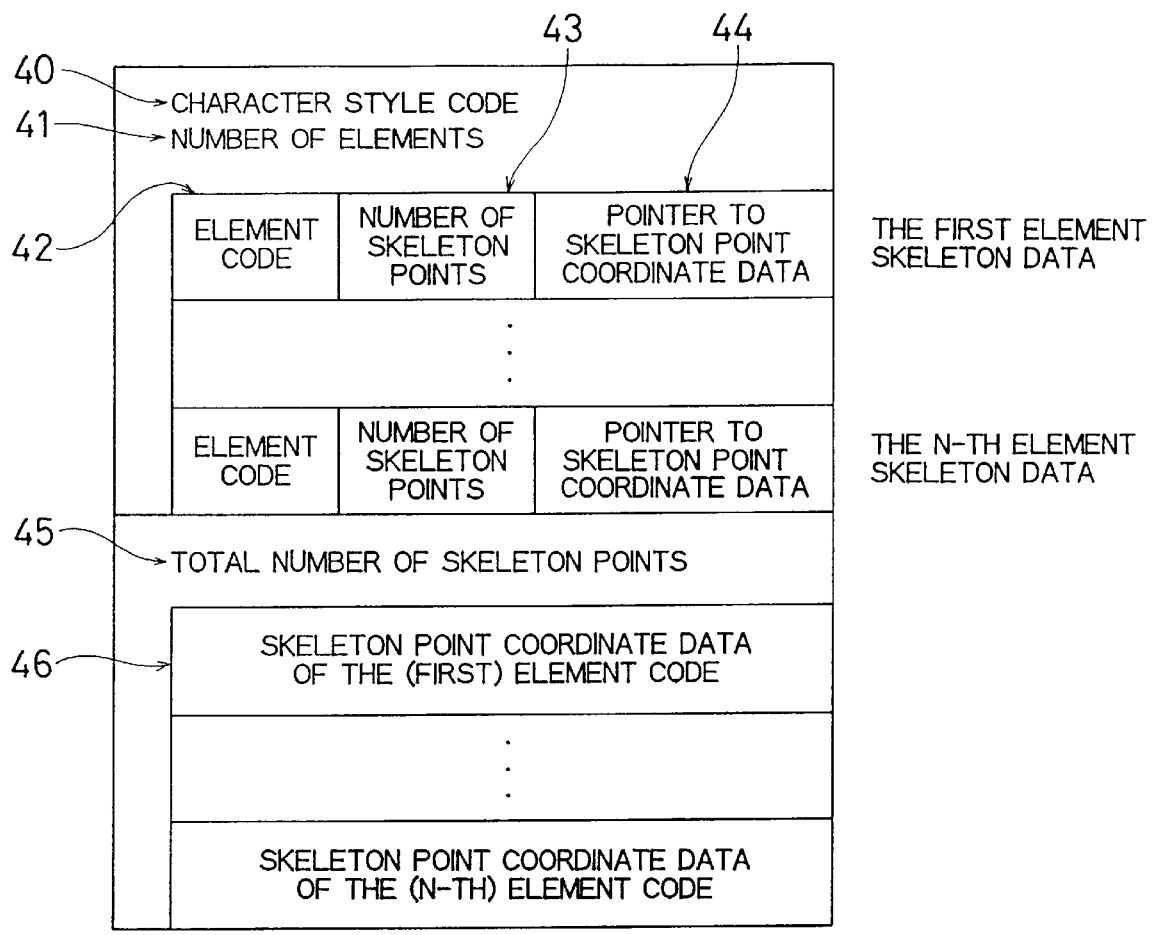
FIG. 5 is an explanatory view for showing an example of the contents stored in the element skeleton shape data according to embodiment 1 of the present invention.

FIG. 5 is an explanatory view showing an example of stored element skeleton shape data. In the element skeleton shape data, a character style code 40 indicating the character style is first stored and then the number 41 of elements prepared for the character style is stored, followed by element skeleton data 1 to N, provided that the number of elements is N.

Namely, the element skeleton data are provided for each element and each of the element skeleton data comprises an element code 42, a number 43 of skeleton points constituting the skeleton, and a pointer 44 pointing to the skeleton point coordinate data. The group of element skeleton data is followed by the total number 45 of skeleton points and skeleton point coordinate data 46 of each element.

Figure 6:
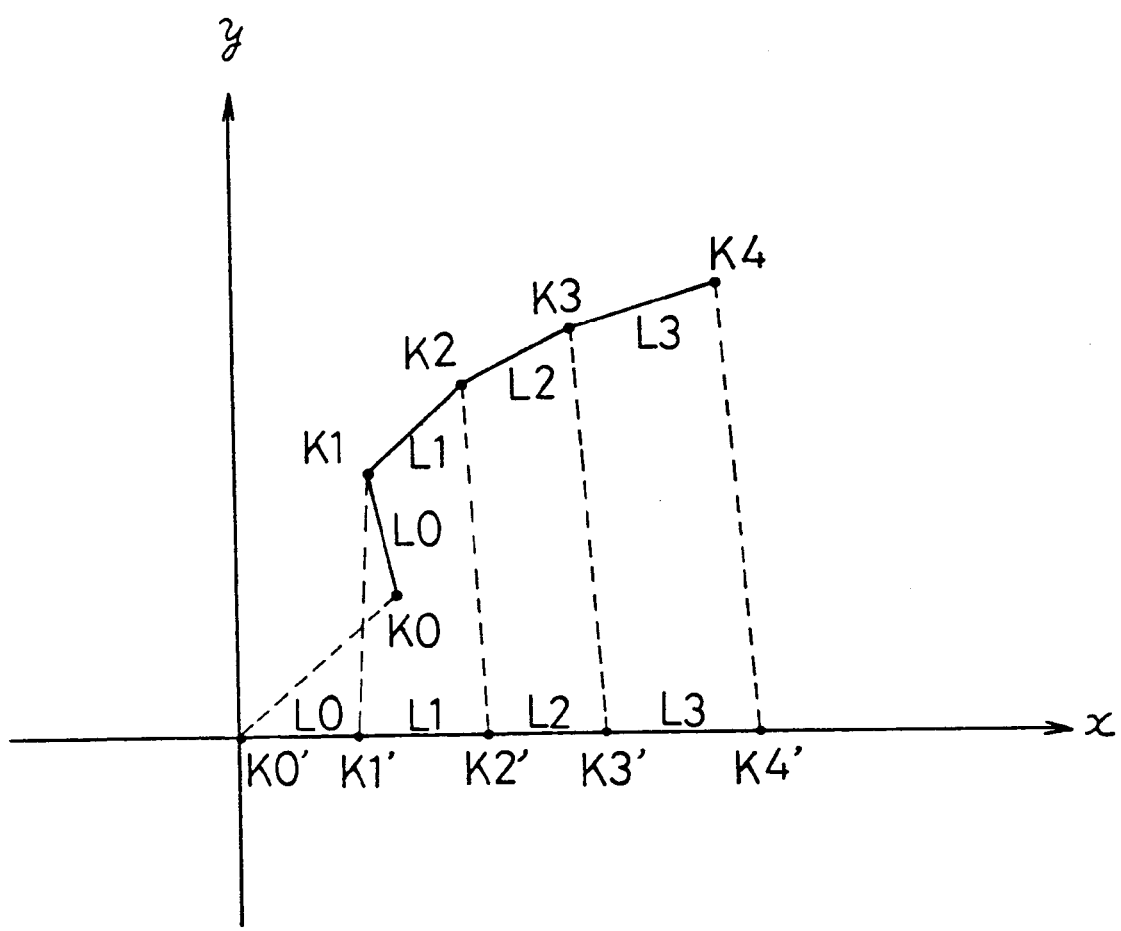
FIG. 6 is an explanatory view for showing the transference of skeleton points by coordinate transformation of the element skeleton shape data according to embodiment 1 of the present invention.

Here, the skeleton points of each element are stored after the X and Y coordinates of each skeleton point in the original element shape are subjected to coordinate transformation so that the Y coordinate of each skeleton point will be zero. FIG. 6 shows a correspondence between the skeleton points in the original skeleton shape and the skeleton points after the coordinate transformation. In FIG. 6, the points K0, K1, K2, K3, and K4 show original skeleton points which one constituent element in the element skeleton shape data has. These are skeleton points of the element corresponding to "stretched" portion "／" constituting the left-hand radical "亻" of the Kanji character shown in FIG. 4 (the character shape skeleton data of the character "伊").

The line segments connecting the skeleton points K0, K1, K2, K3, and K4 are let to be K0-K1, K1-K2, K2-K3, K3-K4, and the lengths of the line segments are L0, L1, L2, and L3, respectively.

First, the skeleton point K0 is transferred to K0' having a coordinate value of (0,0). Then, the skeleton point K1 is transferred to K1' which is located at a position away from K0' by the length L0 in the X-axis direction. Similarly, the skeleton point K2 is transferred to K2' which is located at a position away from K1' by the length L1 in the X-axis direction; the skeleton point K3 is transferred to K3' which is located at a position away from K2' by the length L2 in the X-axis direction; the skeleton point K4 is transferred to K4' which is located at a position away from K3' by the length L3 in the X-axis direction. The skeleton points K0', K1', K2', K3', and K4' thus subjected to coordinate transformation are stored as the skeleton point coordinate data in the element skeleton shape data.

Figure 7:
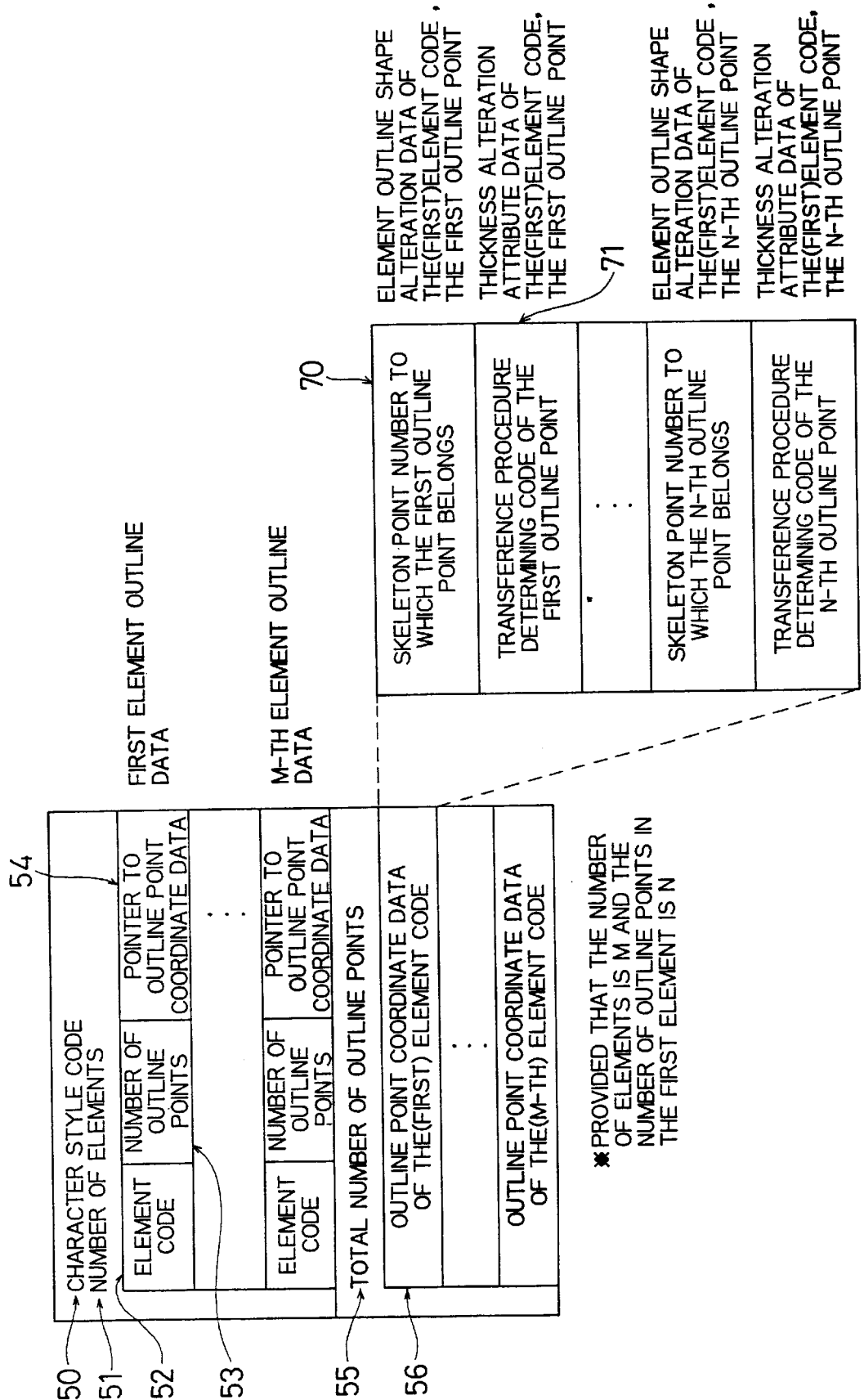
FIG. 7 is an explanatory view for showing an example of the contents stored in the element outline shape data according to embodiment 1 of the present invention.

FIG. 7 is an explanatory view showing an example of stored element outline shape data. In the element outline shape data, a character style code 50 indicating the character style is first stored and then the number 51 of elements prepared for the character style is stored, followed by element outline data 1 to M, provided that the number of elements is M.

Namely, the element outline data are provided for each element and each of the element outline data comprises an element code 52, a number 53 of outline points constituting the outline, and a pointer 54 pointing to the outline point coordinate data. The group of element outline data is followed by the total number 55 of outline points and outline point coordinate data 56 of each element.

The outline point coordinate data 56 of an element include element outline shape alteration data 70 and thickness alteration attribute data 71. The element outline shape alteration data 70 show correspondence between the outline points of the element outline shape and the skeleton points of the element skeleton shape in an element having the same element code. The element outline shape alteration data 70 are stored in the form of skeleton point number to which each of the outline points belongs. The thickness alteration attribute data 71 are stored in the form of transference procedure determining code which shows the procedure of transferring the outline points in altering the thickness.

Figure 8:
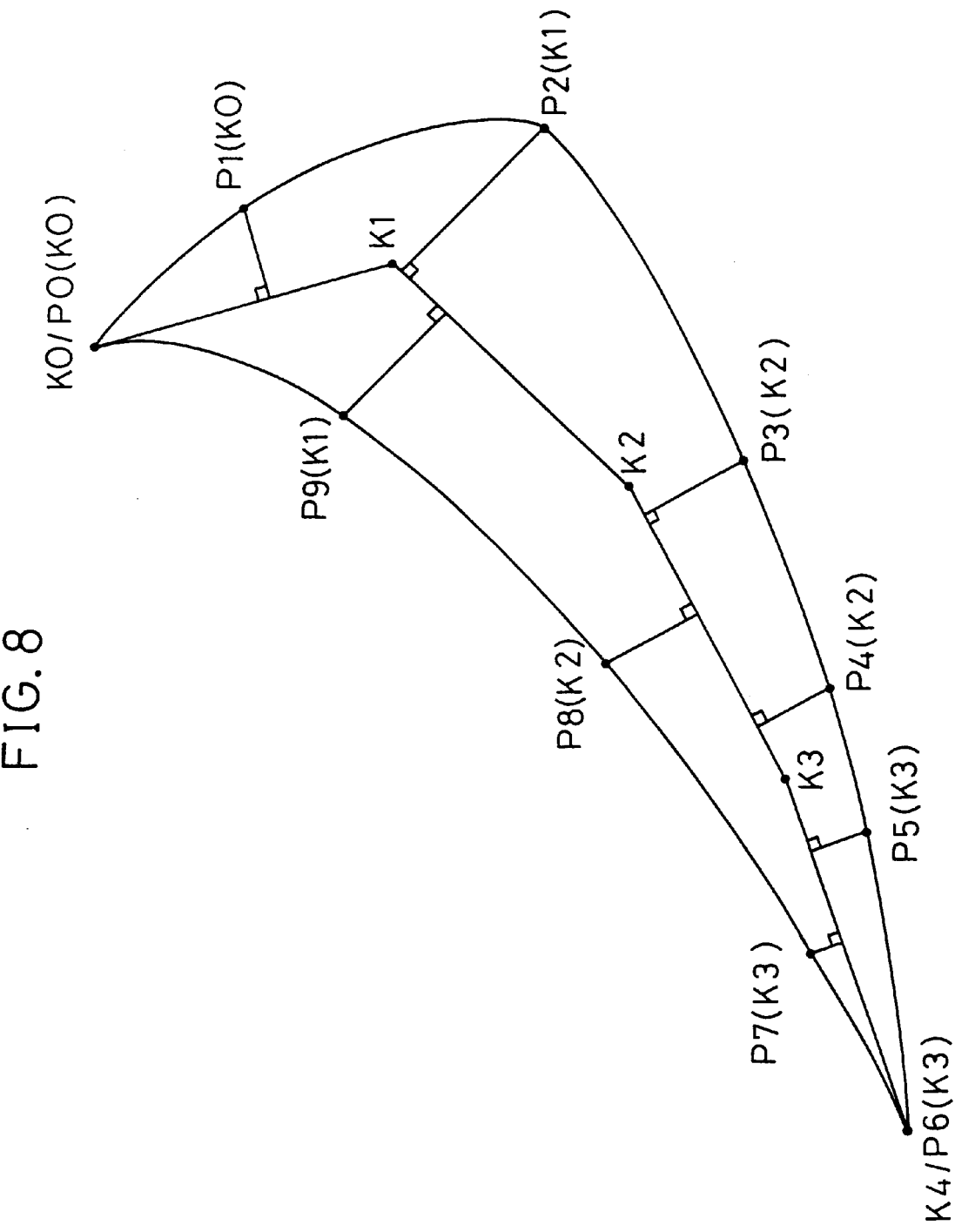
FIG. 8 is an explanatory view for showing correspondence between the outline points of the element outline shape and the skeleton points of the element skeleton shape according to embodiment 1 of the present invention.

FIG. 8 shows element outline shape alteration data, namely a correspondence between the outline points in the element outline shape and the skeleton points in the element skeleton shape, in one constituent element. In FIG. 8, the points K0, K1, K2, K3, and K4 show original skeleton points for one constituent element in the element skeleton shape data. These are skeleton points of the element corresponding to "stretched" portion "／" constituting the left-hand radical "亻" of the Kanji character shown in FIG. 4 (the character shape skeleton data of the character "伊") On the other hand, the points P0, P1, P2, P3, P4, P5, P6, P7, P8, and P9 show outline points for one constituent element in the element outline shape data. These are outline points of the element corresponding to "stretched" portion "／" constituting the left-hand radical "亻" of the Kanji character shown in FIG. 4 (the character shape skeleton data of the character "伊").

The line segments connecting the skeleton points K0, K1, K2, K3, and K4 are let to be K0-K1, K1-K2, K2-K3, and K3-K4, respectively. With respect to each of the outline points P0, P1, P2, P3, P4, P5, P6, P7, P8, and P9, calculation is made to determine the line segment whose distance from the outline point is the shortest. The number of the skeleton point which is the starting point of the line segment thus determined is allotted as the skeleton point number to which the outline point belongs. The skeleton point numbers thus determined are stored as element outline shape alteration data in the element outline shape data. If the coordinate value of one skeleton point changes in the process of altering the element outline shape in association with the deformation of the element skeleton shape, the two line segments defined by the preceding skeleton point and the succeeding skeleton point are determined to find the numbers of the two skeleton points which are the starting points of the two line segments. All the outline points having, as the element outline shape alteration data, the same skeleton number as the two skeleton points are now an object of transference.

The shape of each element in the element outline shape data are altered in advance by transference of the outline points in association with the fact that, in the corresponding element skeleton shape, the X and Y coordinate values of the skeleton point which the original shape has are subjected to coordinate transformation so that all the Y coordinate values will be zero. In other words, the outline points P0 to P9 in the element outline shape data are transferred in accordance with the transference of the line segments K0-K1, K1-K2, K2-K3, and K3-K4 in the element skeleton shape data as previously explained in FIG. 8.

The transference of outline points are now explained hereinafter in detail by referring to FIG. 9. Here, the explanation will be given on a case in which only the line segment K3-K4 is transferred. The outline shape alteration data show that, when the line segment K3-K4 is transferred to K3'-K4', the outline points P5, P6, and P7 are objects of transference (since the number of the skeleton point to which the outline points P5, P6, and P7 belong is (K3)). The condition of the transference of the outline points P5 and P7 are as follows.

(1) The feet of the perpendiculars from the outline points P5 and P7 to the line segment K3-K4 become CP1 and CP2, respectively. The lengths of the line segments K3-CP1, CP1-CP2, and CP2-K4 are defined to be L1, L2, and L3, respectively.

The points CP1' and CP2' will be generated on the line segment K3'-K4'in proportion to the ratio L1:L2:L3 of the line segment K3-K4 (the skeleton point K3' is the same as the skeleton point K3). Here, the lengths of the line segments K3'-CP1', CP1'-CP2', and CP2'-K4' are assumed to be L1', L2', and L3', respectively.

(2) Assume the distances from the points P5 and P7 to the line segment K3-K4 to be D5 and D7, respectively, and the points P5 and P7 will be transferred to the points P5' and P7' away from the points CP1' and CP2' obtained in (1) in a direction perpendicular to the line segment K3'-K4' by the distances of D5 and D7, respectively.

Figure 9:
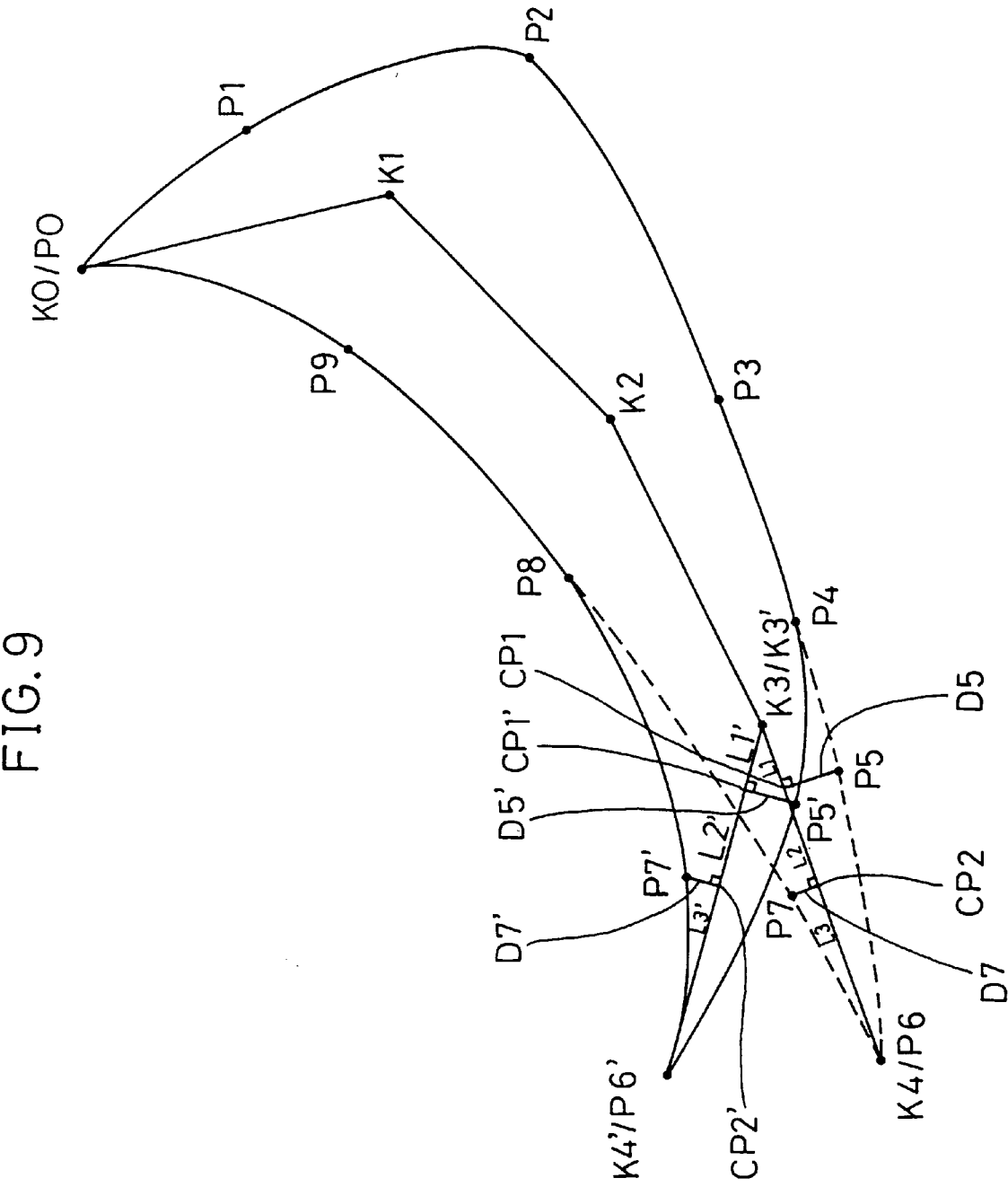
FIG. 9 is an explanatory view for showing the transference of outline points in altering the element outline shape according to embodiment 1 of the present invention.

Namely, in FIG. 9, the conditions for the transference of the points P5 and P7 are:

(a) the length ratio L1:L2:L3=L1':L2':L3', (b) the distance D5=D5' and the distance D7=D7'.

Though the condition for the transference of the outline point P6 is the same, the outline point P6 will be transferred to the outline point P6' which is the same point as the skeleton point K4' transferred from the skeleton point K4 because the outline point P6 has the same coordinate values as the skeleton point K4 in FIG. 9.

Figure 10A:
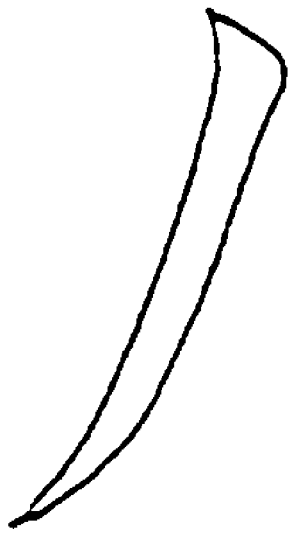
FIG. 10A is an explanatory view of an example of the original outline shape of one element in the element outline shape data according to embodiment 1 of the present invention.
Figure 10B:
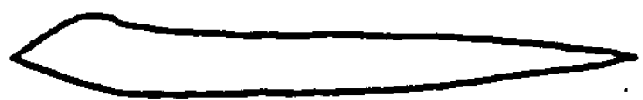
FIG. 10B is an explanatory view of an example of the outline shape of one element after the coordinate transformation in the element outline shape data according to embodiment 1 of the present invention.

By this process of transferring the outline points satisfying the above conditions (a) and (b), the element outline shape can be altered in accordance with the coordinate transformation of the element skeleton shape. The outline points thus altered are stored as the outline point coordinate data in the element outline shape data. An example of the original outline shape of one constituent element in the element outline shape data is shown in FIG. 10A, and an example of the altered outline shape is shown in FIG. 10B.

Figure 11:
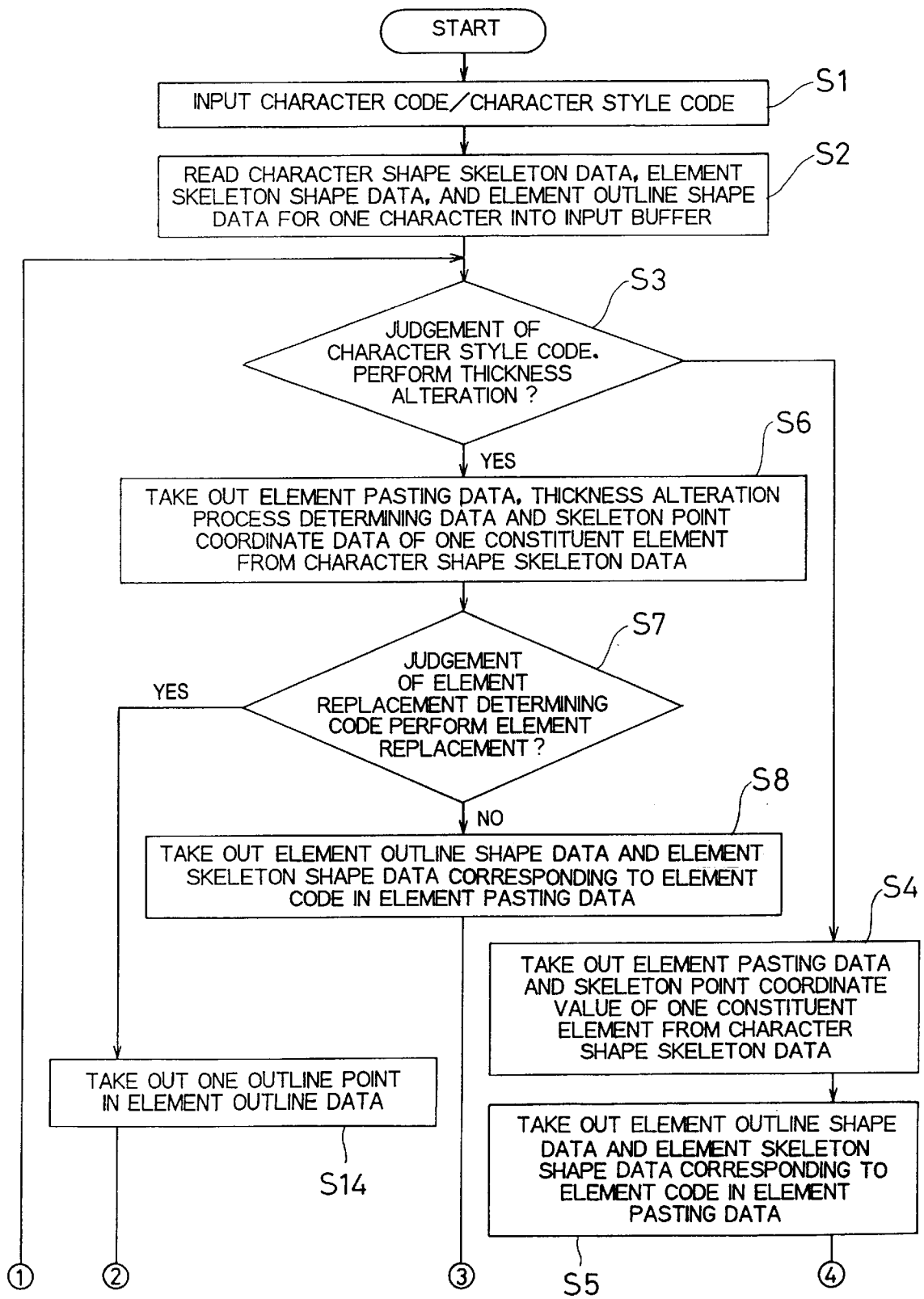
FIG. 11 is a flow chart showing the operation according to embodiment 1 of the present invention.
Figure 12:
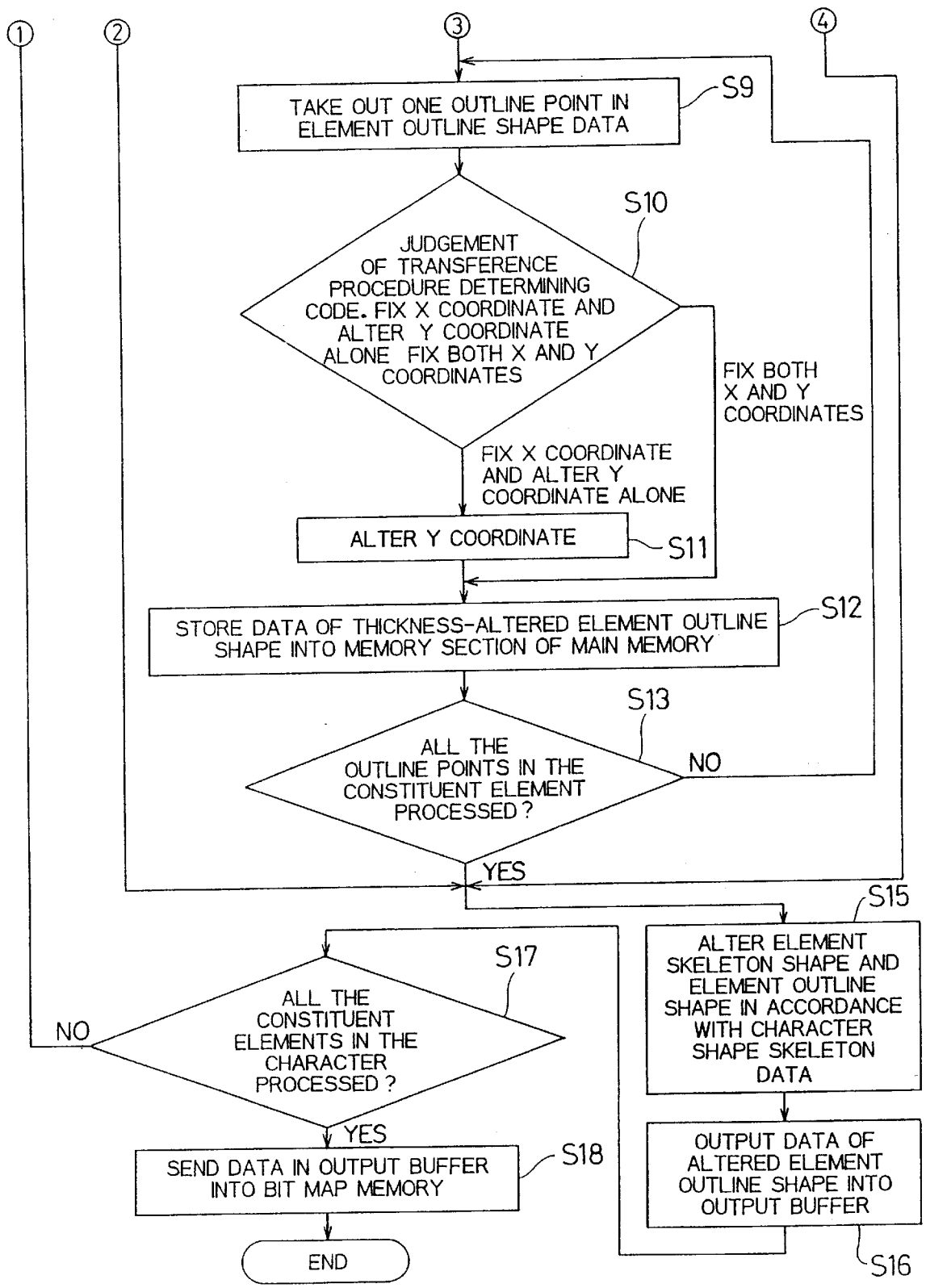
FIG. 12 is a flow chart showing the operation according to embodiment 1 of the present invention.

The operation of the character pattern generating apparatus thus constructed is now explained hereinafter in conjunction with the flowchart shown in FIGS. 11 and 12.

First, the character code and the character style code of a character to be generated are inputted from the keyboard 10 (step S1). The CPU 12 then reads, for each character, character shape skeleton data used for the generation process in accordance with the character code and also reads the element skeleton shape data and the element outline shape data corresponding to the character style code from the auxiliary memory 11 into the input buffer of the main memory 13 (step S2).

Then, in the thickness determining section, the CPU 12 determines, from the character style code inputted in step S1, whether or not the character style to be generated is a character style that should be subjected to thickness alteration (step S3). If it is a character style that need not be subjected to thickness alteration, the flow proceeds to step S4. If it is a character style that need to be subjected to thickness alteration, the flow proceeds to step S6.

In step S4, from the character shape skeleton data read in step S2, the CPU 12 takes in the element pasting data and the skeleton point coordinate data of one constituent element from the input buffer into the working memory within the CPU 12.

In step S5, from the element skeleton shape data and the element outline shape data read into the input buffer, the CPU 12 takes in the skeleton point coordinate data 39 and the outline point coordinate data 56 of the element corresponding to the element code 35 into the working memory within the CPU 12.

The flow then proceeds to step S15. Based on the skeleton point coordinate data of a constituent element in the character shape skeleton data taken into the working memory within the CPU 12 in step S4, the element skeleton shape/ element outline shape altering section in the CPU 12 lets the coordinate value of each skeleton point in the element skeleton shape data coincide with the skeleton point coordinate data by means of enlargement, contraction, rotation, and others.

The outline points P0 to P9 in the element outline shape data are then transferred in accordance with the condition of transferring the line segments K0-KL, K1-K2, K2-K3, and K3-K4 in the element skeleton shape data previously explained in FIG. 8. The condition of transferring the outline points is identical with what has been described with reference to FIG. 9.

After the transferring process of all the outline points in the constituent element is finished, the transferred outline points P0' to P9' are outputted to the output buffer of the main memory 13 in step S16.

If the CPU 12 judges that the character style to be generated needs an alteration of thickness in the above step S3, the CPU 12 performs the following process.

In step S6, from the character shape skeleton data read in step S2, the CPU 12 takes in the element pasting data, the thickness alteration process determining data, and the skeleton point coordinate data of one constituent element from the input buffer into the working memory within the CPU 12.

The flow then proceeds to step S7. The thickness alteration procedure determining section in the CPU 12 examines the element replacement determining code in the thickness alteration process determining data and judges whether the replacement of the element should be carried out or not. If the character style designated by the character style code is a thick character pattern, the element replacement determining code 60 (for thick characters) is used. If the character style designated by the character style code is a thin character pattern, the element replacement determining code 61 (for thin characters) is used. If the element replacement is to be carried out, the flow proceeds to step S14. If the thickness alteration process is to be carried out without the element replacement, the flow proceeds to step S8.

In step S8, from the element skeleton shape data and the element outline shape data read into the input buffer, the CPU 12 takes in the skeleton point coordinate data 46 and the outline point coordinate data 56 of the element corresponding to the element code 35 into the working memory within the CPU 12. Then, the element outline thickness altering section in the CPU 12 takes out one outline point and the corresponding thickness alteration attribute data from the outline point coordinate data (step S9).

In step S10, the CPU 12 examines the thickness alteration attribute data and judges whether (a) the X coordinate of the outline point is to be fixed and the Y coordinate alone of the outline point is to be altered or (b) both of the X and Y coordinates are to be fixed in altering the thickness of the element outline shape. If the X coordinate is to be fixed and the Y coordinate alone is to be altered, the flow proceeds to step S11. If both of the X and Y coordinates are to be fixed, the flow proceeds to step S12 without transferring the outline point.

Figure 13:
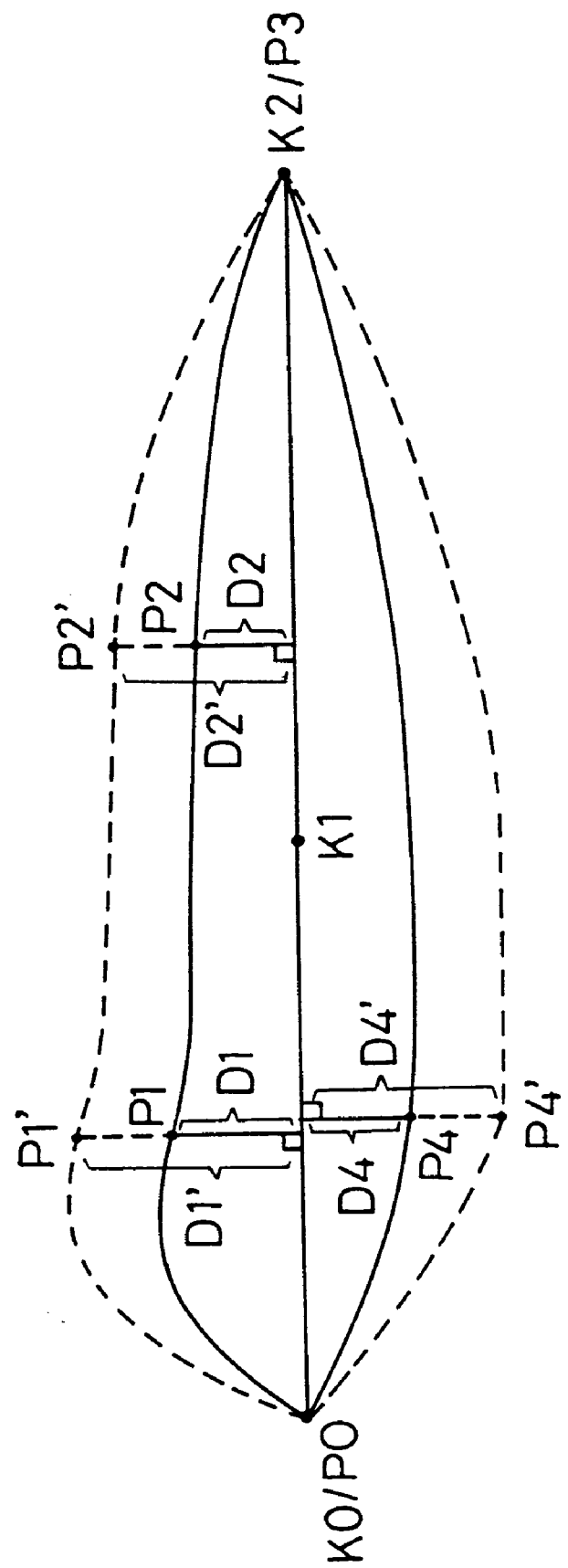
FIG. 13 is an explanatory view for showing the transference of outline points in altering the thickness according to embodiment 1 of the present invention.

FIG. 13 shows the transference of outline points in altering the thickness. In FIG. 13, the points K0, K1, and K2 show skeleton points which one constituent element in the element skeleton shape data has after the coordinate transformation. These are skeleton points of the element corresponding to "stretched" portion "/" constituting the left-hand radical "亻" of the Kanji character shown in FIG. 4 (the character shape skeleton data of the character "伴") On the other hand, the points P0, P1, P2, P3, and P4 show outline points which one constituent element in the element outline shape data has after the coordinate transformation. These are outline points of the element corresponding to "stretched" portion "/" constituting the left-hand radical "亻" of the Kanji character shown in FIG. 4 (the character shape skeleton data of the character "伴"). However, in FIG. 13, the skeleton points and the outline points that are not directly relevant to the explanation have been omitted for simplicity reason as compared with FIGS. 8 and 9. The points P0 and P3 are the starting point and the end point of the outline shape. In this example, it is assumed that both of the X and Y coordinates are to be fixed and the transference procedure determining code of the points P1, P2, and P4 indicates that the X coordinate is to be fixed and the Y coordinate alone is to be altered.

The line segment connecting the skeleton points K0 and K1 is let to be K0-K1, and the line segment connecting the skeleton points K1 and K2 is let to be K1-K2. These line segments are all arranged on the X axis since each of the skeleton point in the element skeleton shape data has been subjected to coordinate transformation so that the Y coordinates will be zero. The distance to the nearest line segment as viewed from each of the outline points P1, P2, and P4 is let to be D1, D2, and D4, respectively. The distances D1, D2, and D4 are each identical to the absolute value of the Y coordinate of each outline point since the outline points in the element outline shape data have been altered in accordance with the coordinate transformation of the element skeleton shape data.

The distance D1 multiplied by a thickness alteration constant defined in advance in the program memory of the CPU 12 is let to be the distance D1', which is then subjected to judgement of the sign (positive or negative) to give the Y coordinate of the transferred outline point P1' (step S11).

The CPU then stores the outline point P1' into the memory section of the main memory 13 (step S12). Here, the thickness constant is a constant determined for each character style to be generated. If a thick character is to be generated, the constant is greater than one. If a thin character is to be generated, the constant is smaller than one.

For each transference of outline points, the CPU 12 judges whether the thickness alteration process of all the outline points in the constituent element has been completed or not (step S13). If the thickness alteration process has not been completed for all the outline points, the flow goes back to step S9 for carrying out the process for the next outline point. In FIG. 13, the points P2' and P4' as well as the point P1' are the outline points after the transference.

The flow then proceeds to step S15. Based on the skeleton point coordinate data of a constituent element in the character shape skeleton data taken into the working memory within the CPU 12, the element skeleton shape/element outline shape altering section in the CPU 12 lets the coordinate value of each skeleton point of the element skeleton shape data coincide with the skeleton point coordinate data by means of enlargement, contraction, rotation, and others. In association with the deformation of the element skeleton shape, the thickness-altered outline points stored in the memory section of the main memory 13 are transferred. The condition for transferring the outline points are identical to the condition previously described with reference to FIG. 9.

After the process of transferring all the thickness-altered outline points for one constituent element is completed, the CPU outputs the transferred outline points into the output buffer of the main memory 13 in step S16.

If the CPU 12 judges, in the above step S7, that the element replacement of the constituent element is to be carried out, the CPU 12 performs the following process.

In step S14, the CPU 12 detects an alternative element code corresponding to the element code 35 in the character shape skeleton data. If the character style to be generated is a thick character pattern, the CPU detects an alternative element code 62 (for thick characters). If the character style to be generated is a thin character pattern, the CPU detects an alternative element code 63 (for thin characters). Then, the CPU 12 takes in the skeleton point coordinate data 46 and the outline point coordinate data 56 of the element corresponding to the alternative element code into the working memory of the CPU 12.

The flow then proceeds to step S15. Based on the skeleton point coordinate data of a constituent element in the character shape skeleton data taken into the working memory within the CPU 12, the element skeleton shape/element outline shape altering section in the CPU 12 lets the coordinate value of each skeleton point of the element skeleton shape data coincide with the skeleton point coordinate data by means of enlargement, contraction, rotation, and others. In association with the deformation of the element skeleton shape, the outline points in the element outline shape data are transferred. The condition for transferring the outline points are identical to the condition previously described with reference to FIG. 9.

After the process of transferring all the outline points for one constituent element is completed, the CPU outputs the transferred outline points into the output buffer of the main memory 13 in step S16.

Figure 14:
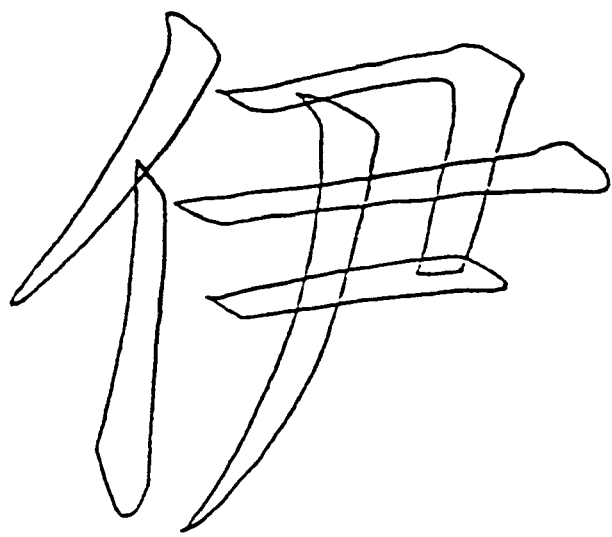
FIG. 14 is an explanatory view for showing an example of geometric information after altering the outline shape in the element outline shape data according to embodiment 1 of the present invention.
Figure 15:
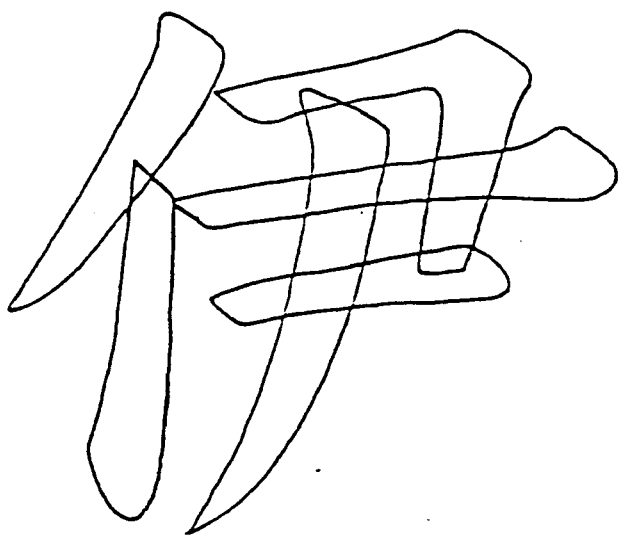
FIG. 15 is an explanatory view for showing an example of geometric information after altering the thickness and the outline shape in the element outline shape data according to embodiment 1 of the present invention.

FIG. 14 shows geometric information after altering the element outline shape data in accordance with the skeleton shape "伊" which is the character shape skeleton data exemplified in FIG. 4. Also, FIG. 15 shows geometric information after altering the thickness and the outline shape of the elements in the skeleton shape "伊".

In step S17, the CPU 12 judges whether all the constituent elements in the character are processed or not. If the judgement is "Yes", the flow proceeds to step S18, in which the data in the output buffer of the main memory 13 are sent to the bit map memory 14 to finish the process. If the judgement is "No", the flow goes back to step S3, in which the CPU 12 examines the character style code.

The outline point data sent to the bit map memory 14 are then expanded into bit map data to be printed and outputted by the output device 15 such as a laser printer, a thermal printer, or the like.

Thus, in altering the thickness of a constituent element in the character, the CPU 12 judges whether the thickness of the constituent element is to be performed by calculation or by replacing the element with an alternative thick (thin) element. In accordance with the judgement, the element skeleton shape data are altered by calculation or by replacement on the basis of the character shape skeleton data and, further, the element outline shape is altered. Then, a character pattern is generated using the altered outline shape.

This makes it possible to develop a character style in a smaller number of steps because character patterns can be generated by only designing the element outline shapes representing the outlines of the constituent elements when compared with the prior art font development in which all the character patterns must be designed.

Also, the outline of the character is generated by using the element pasting data including, for each constituent element, skeleton shape alteration data and an element code indicating the outline shape corresponding to the constituent element. Therefore, no configurational limitation is imposed in designing the character shape and the character styles can be freely designed without hindrance when compared with the conventional method of storing the skeleton point coordinates representing the skeleton shape of the character and the single line width parameter at each skeleton point.

Further, since the character shape skeleton data include thickness alteration process determining data, it is possible to select, for each constituent element, the most suitable method between the deformation by thickness altering process and the deformation by the element replacement, whereby a thick or thin character pattern having an extremely high quality can be generated.

Moreover, since the element outline shape data include thickness alteration attribute data, it is possible to select the transference procedure for each outline point, whereby a thick or thin character pattern having an extremely high quality can be generated by finely adjusting the outline shape in altering the thickness.

In addition, the apparatus of the invention is adapted to store the outline shape alteration data for use in altering the element outline shape and to deform the outline shape without generating a distortion, whereby the element outline shapes can be used in common and it is possible to reduce the amount of element outline shape data required for developing one character style.

Furthermore, the element skeleton shape and the element outline shape are stored after subjecting them to coordinate transformation in advance so that they are arranged on the X-axis. Accordingly, the amount of high-grade calculation such as angle calculation can be reduced in altering the element skeleton shape and the element outline shape and in altering the thickness, whereby character patterns can be generated at a high speed.

Also, in altering the thickness, the Y coordinate values can be adjusted by a simple multiplication to alter the thickness of the constituent elements, whereby thick or thin character patterns can be generated at an extremely high speed.

In this Embodiment, the CPU judges on the basis of the designated character style code whether the thickness of the character is to be altered. Alternatively, however, the apparatus may allow the user to designate arbitrary thickness of the character to be generated and may allow the thickness of the character to be altered in accordance with the designation, Still alternatively, classes in three grades consisting of thick character, ordinary character, and thin character or in five grades consisting of thick character, a little thick character, ordinary character, a little thin character, and thin character may be prepared in advance to allow the user to select an arbitrary class among them. Naturally, in such a case, good alternative elements should also be prepared.

Also, the judgement as to which of the constituent elements should be subjected to thickness alteration by calculation and which of the constituent elements should be subjected to replacement with an alternative element may be carried out as follows. For example, for an element whose character quality will be deteriorated if the thickness alteration of the character is carried out by calculation, an alternative element may be prepared for replacement therewith. This makes it possible to generate extremely high-quality uniform thick or thin character patterns.

Embodiment 2

Figure 16:
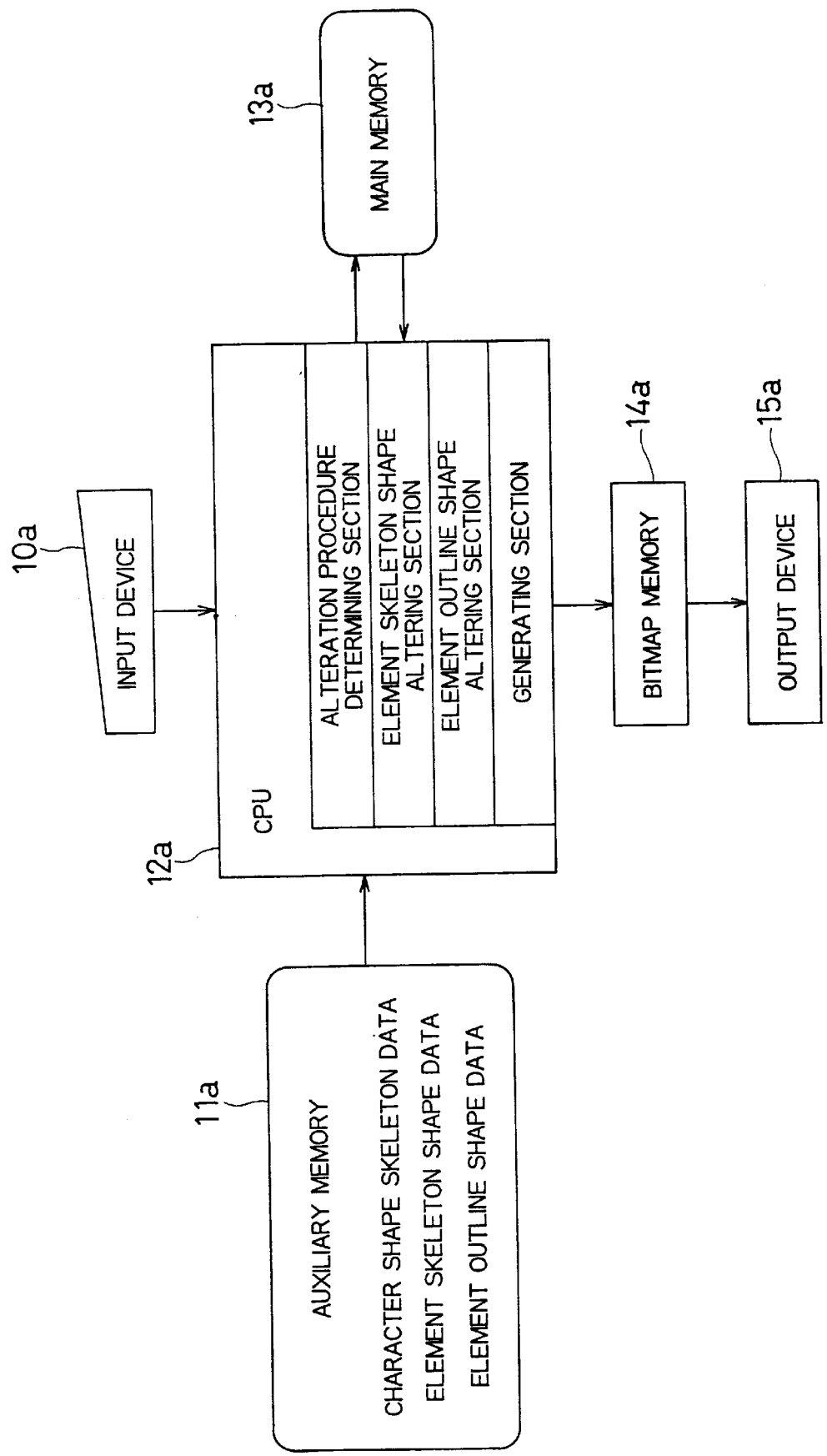
FIG. 16 is a block diagram for showing a schematic construction of a character pattern generating apparatus according to embodiment 2 of the present invention.

FIG. 16 is a block diagram showing a schematic construction of a character pattern generating apparatus according to embodiment 2 of the present invention. Referring to FIG. 16, the character pattern generating apparatus comprises an input device 10a including a key board or the like, an auxiliary memory 11a, a CPU 12a, a main memory 13a, a bit map memory 14a, and an output device 15a including a laser printer, a thermal printer, or the like.

The input device 10a is used for inputting the character code of a character to be generated and a character style code. The auxiliary memory 11a stores character shape skeleton data, element skeleton shape data, and element outline shape data.

The CPU 12a includes an element skeleton shape altering section for altering the element skeleton shape in accordance with the character shape skeleton data, an element outline shape altering section for altering the element outline shape, an alteration procedure determining section for determining the alteration procedure in altering the element outline shape, and a generating section for generating a character pattern.

Also, the CPU 12a comprises a memory for programs and a memory for work area for performing a control operation to generate character patterns based on each of the data in the auxiliary memory 11a and the main memory 13a. These character patterns are expanded into bit map data on the bit map memory 14a and are outputted by printing via the output device 15a such as a laser printer or a thermal printer.

The main memory 13a comprises an input buffer for temporarily storing the character data read out from the auxiliary memory 11a, an output buffer for temporarily storing the element outline shape data representing the altered shapes, and a memory portion for storing the element skeleton shape data representing the altered shapes and for storing the outline shape alteration data.

The outline shape of a character is stored by employing, for example, (1) a method of storing the outline of the character by line approximation, (2) a method of storing the outline of the character by lines and circular arcs, (3) a method of storing the outline of the character by lines and curves. Among these methods, the method (3) is the most suitable for generating the character patterns considering the character quality, the efficiency of data volume, and others. Thus, in this embodiment, the data obtained by the above method (3) are stored in the auxiliary memory 11a as coordinate data of outline points in the element outline shape data.

Figure 17:
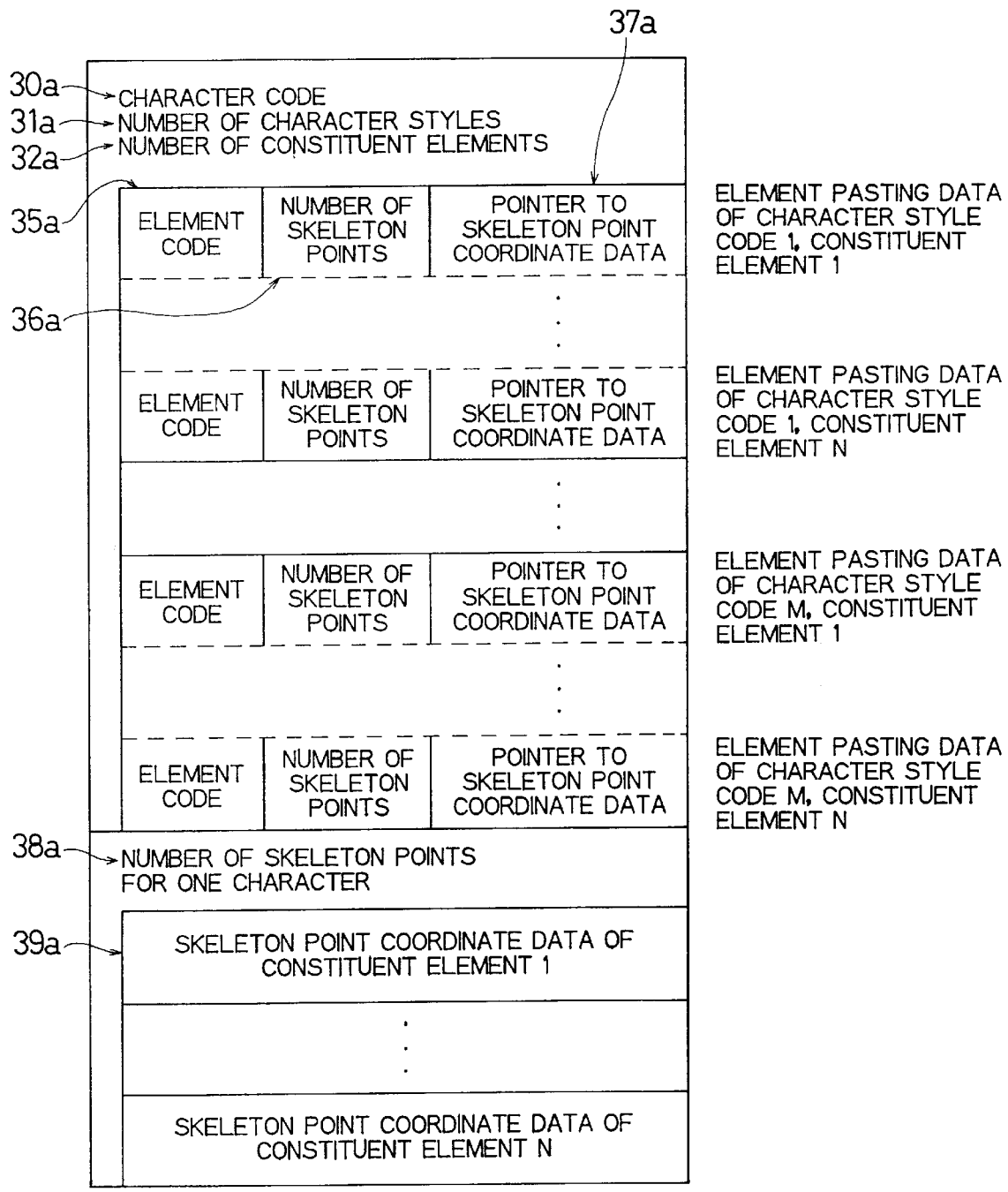
FIG. 17 is an explanatory view for showing an example of the contents stored in the character shape skeleton data according to embodiment 2 of the present invention.

Next, the contents stored in the auxiliary memory 11a are now explained. FIG. 17 is an explanatory view showing an example of stored character shape skeleton data. The character shape skeleton data include character codes 30a for differentiating character kinds, the number 31a of character styles generated from one character shape skeleton data, and the number 32a of elements constituting the character shape. Also, element pasting data are stored for every character code and for every constituent element.

The element pasting data are stored by the number of character-constituting elements multiplied by the number of generated character styles. The element pasting data comprise an element code 35a for indicating the element outline shape corresponding to the constituent element, a number 36a of skeleton points forming the constituent element, and a pointer 37a pointing to the skeleton point coordinate data.

Figure 18:
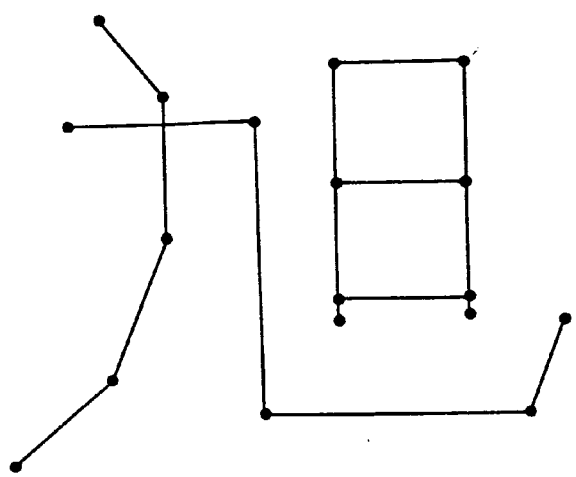
FIG. 18 is an explanatory view for showing an example of geometric information in the character shape skeleton data for one character according to embodiment 2 of the present invention.

After the group of pasting data, the skeleton point coordinate data are subsequently stored. The skeleton point coordinate data include the number 38a of the skeleton points for one character, followed by the skeleton point coordinate data 39a for each constituent element. FIG. 18 shows an example of geometric information in the character shape skeleton data for one character. Although explanation of the element skeleton shape data is omitted here, it is to be understood that the contents similar to those explained in Example 1 are stored.

Figure 19:
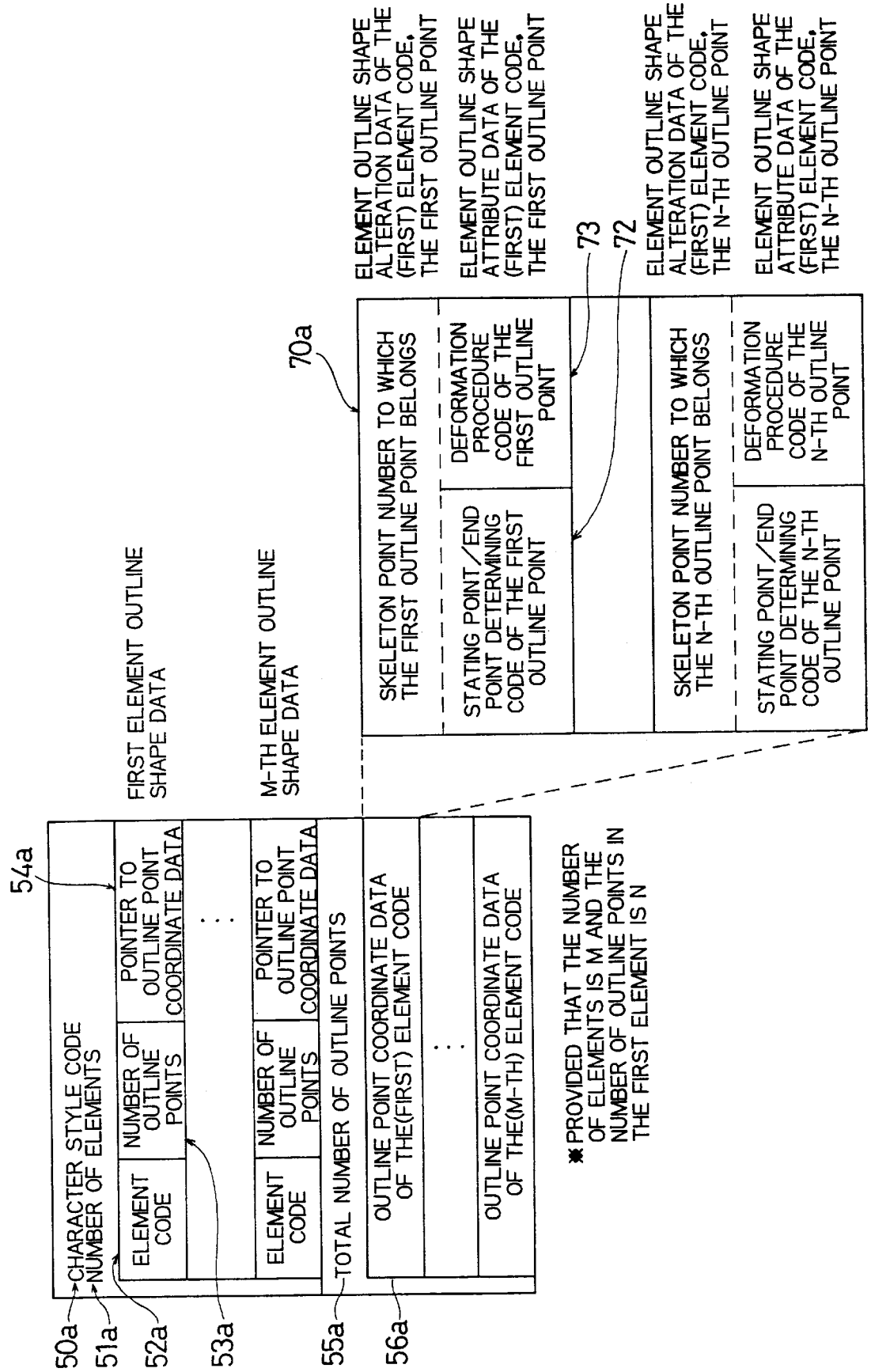
FIG. 19 is an explanatory view for showing an example of the contents stored in the element outline shape data according to embodiment 2 of the present invention.

FIG. 19 is an explanatory view showing an example of stored element outline shape data. In the element outline shape data, a character style code 50a indicating the character style is first stored and then the number 51a of elements prepared for the character style is stored, followed by element data 1 to M, provided that the number of elements is M.

Namely, the element data are provided for each element and each of the element outline data comprises an element code 52a, a number 53a of outline points constituting the outline, and a pointer 54a pointing to the outline point coordinate data. The group of element data is followed by the total number 55a of outline points and outline point coordinate data 56a of each element.

Figure 20A:
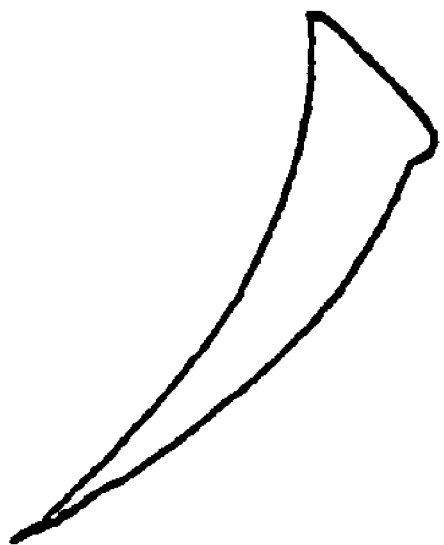
FIG. 20A is an explanatory view for showing an example of geometric information for one element in the element outline shape data according to embodiment 2 of the present invention.
Figure 20B:
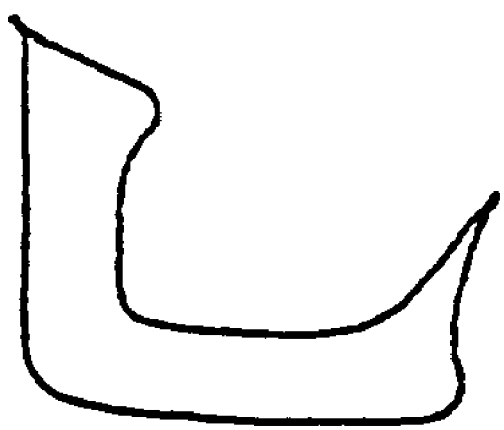
FIG. 20B is an explanatory view for showing an example of geometric information for one element in the element outline shape data according to embodiment 2 of the present invention.

The outline point coordinate data 56a of an element include element outline shape alteration data 70a, starting point/end point determining code 72, and element outline shape attribute data 73. The element outline shape alteration data 70a show correspondence between the outline points of the element outline shape and the skeleton points of the element skeleton shape in an element having the same element code. The element outline shape alteration data 70a are stored in the form of skeleton point number to which each of the outline points belongs. The element outline shape attribute data 73 are stored in the form of deformation procedure code which shows a condition of transferring the outline points in altering the outline shape of the element. The deformation procedure code may be of an ordinary attribute, a relative position preserving attribute, or an absolute position preserving attribute. Specific deformation processes for these attributes are explained later. FIGS. 20A and 20B each show an example of geometric information for one element in the element outline shape data.

Figure 21A:
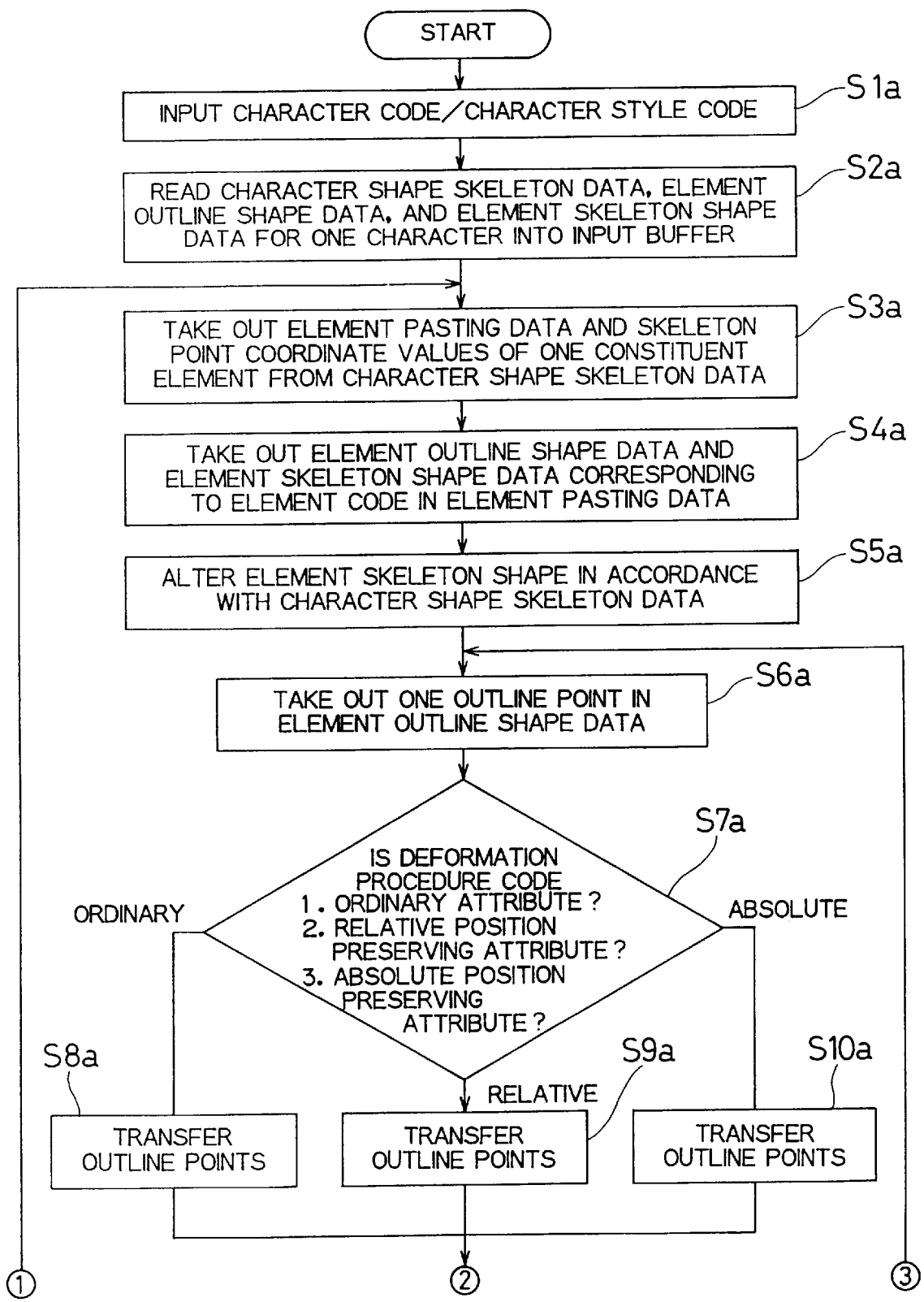
FIGS. 21A and 21B are a flow chart showing the operation according to embodiment 2 of the present invention.
Figure 21B:
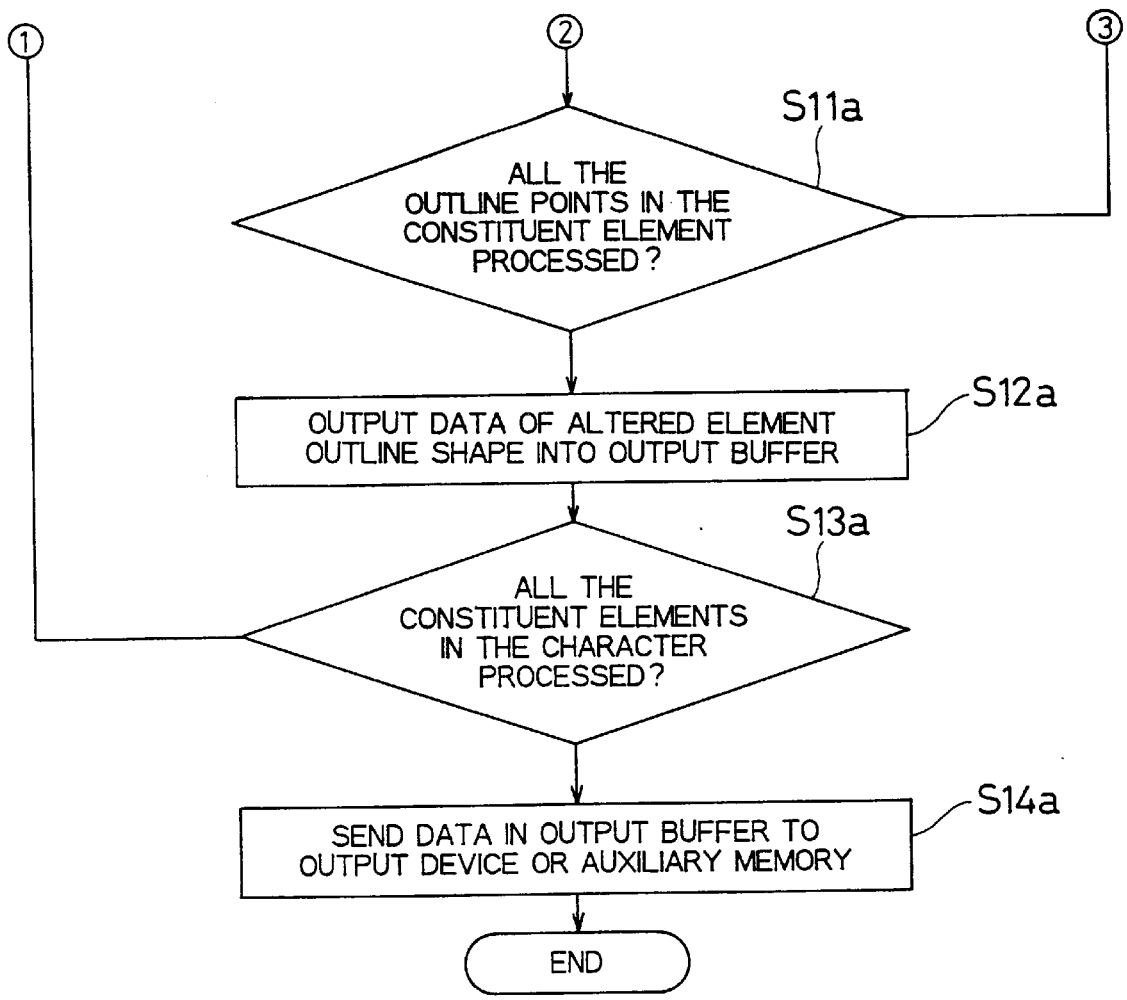

The operation of the character pattern generating apparatus thus constructed is now explained hereinafter in conjunction with the flowchart shown in FIGS. 21A and 21B. In order to make the explanation more specific, it is given by using the character shape skeleton data "旭" previously shown in FIG. 18.

First, the character code (the character code for the character "旭" is "1616" in JIS code) and the character style code (for example, "01") of a character to be generated are inputted from the input device 10a such as a keyboard (step S1a). The CPU 12a then reads, for each character, character shape skeleton data used for the generation process in accordance with the character code and also reads the element skeleton shape data and the element outline shape data corresponding to the character style code from the auxiliary memory 11a into the input buffer of the main memory 13a (step S2a).

Then, from the character shape skeleton data read in step S2a, the CPU 12a takes in the element pasting data and the skeleton point coordinate data of one constituent element from the input buffer into the working memory within the CPU 12a (step S3a).

In step S4a, from the element skeleton shape data and the element outline shape data read into the input buffer, the CPU 12a takes in the skeleton point coordinate data 39a and the outline point coordinate data 56a of the element corresponding to the element code 35a into the working memory within the CPU 12a.

In step S5a, based on the skeleton point coordinate data of a constituent element in the character shape skeleton data taken into the working memory, the CPU 12a lets the coordinate value of each skeleton point in the element skeleton shape data coincide with the skeleton point coordinate data by means of enlargement, contraction, rotation, and others.

Figure 22:
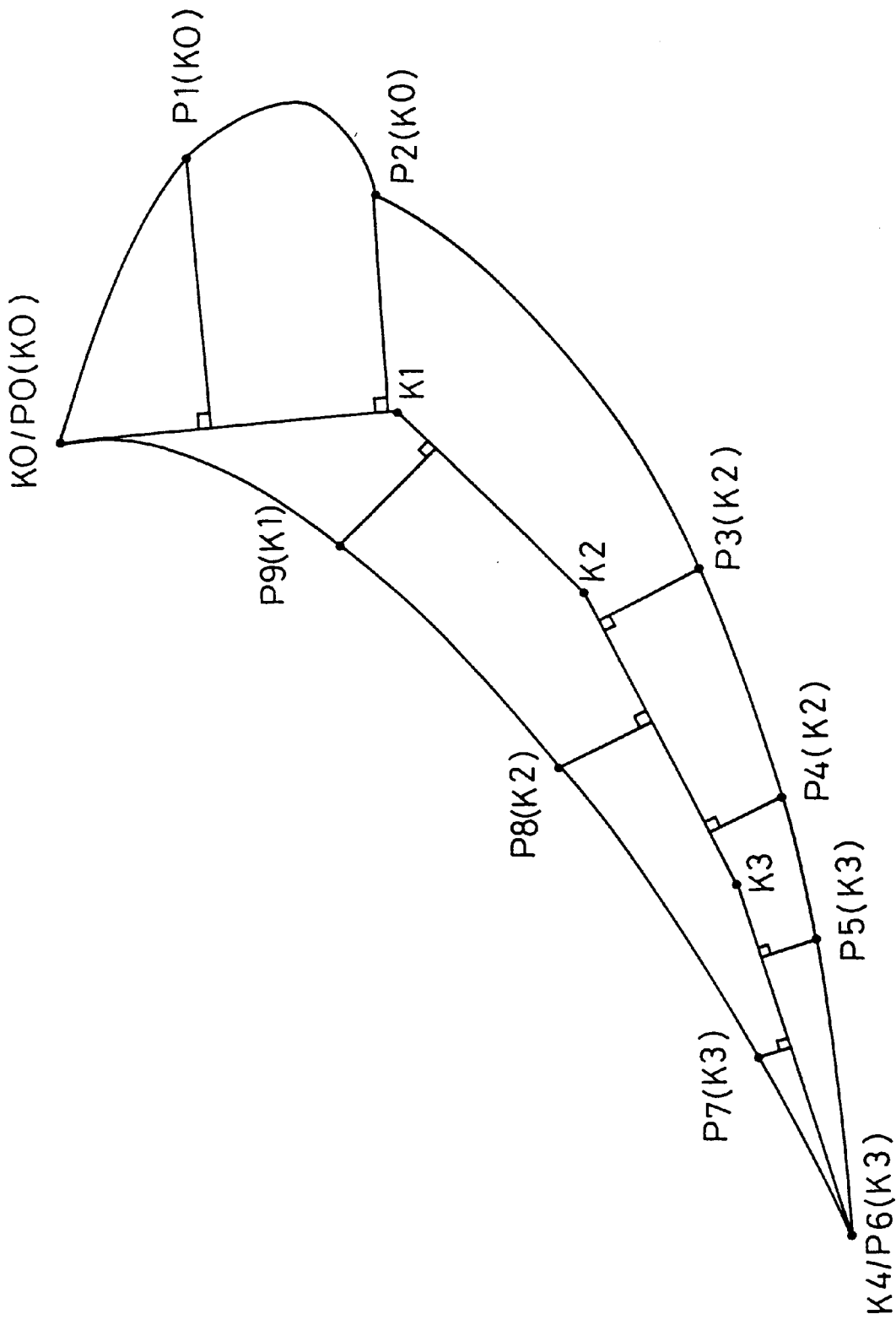
FIG. 22 is an explanatory view for showing correspondence between the outline points of the element outline shape and the skeleton points of the element skeleton shape according to embodiment 2 of the present invention.

FIG. 22 shows element outline shape alteration data, namely a correspondence between the outline points in the element outline shape and the skeleton points in the element skeleton shape, in one constituent element. In FIG. 22, the points K0, K1, K2, K3, and K4 show skeleton points for one constituent element in the element skeleton shape data has. These are skeleton points of the element corresponding to "stretched" portion "ノ" of the Kanji character shown in FIG. 18 (the character shape skeleton data of the character "旭"). On the other hand, the points P0, P1, P2, P3, P4, P5, P6, P7, P8, and P9 show outline points for one constituent element in the element outline shape data. These are outline points of the element corresponding to "stretched" portion "ノ" of the Kanji character shown in FIG. 18 (the character shape skeleton data of the character "旭").

The line segments connecting the skeleton points K0, K1, K2, K3, and K4 are let to be K0-K1, K1-K2, K2-K3, and K3-K4, respectively. With respect to each of the outline points P0, P1, P2, P3, P4, P5, P6, P7, P8, and P9, calculation is made to determine the line segment whose distance from the outline point is the shortest. The number of the skeleton point which is the starting point of the line segment thus determined is allotted as the skeleton point number to which the outline point belongs.

The skeleton point numbers thus determined are stored as element outline shape alteration data in the element outline shape data. If the coordinate value of one skeleton point changes in the process of altering the element outline shape associated with the deformation of the element skeleton shape, the two line segments defined by the preceding skeleton point and the succeeding skeleton point are determined to find the numbers of the two skeleton points which are the starting points of the two line segments. All the outline points having (as element outline shape alteration data) the same skeleton number as the two skeleton points are now an object of transference.

In step S6a, the CPU 12a takes out one outline point and the element outline shape attribute data corresponding thereto from the outline point coordinate data.

Then, in step S7a, the CPU 12a examines the element outline shape attribute data to set a condition of transferring the outline point in altering the element outline shape. In examining the element outline shape attribute data, the flow goes to step S8a if the deformation procedure code is an ordinary attribute, to step S9a if the code is a relative position preserving attribute, and to step S10a if the code is an absolute position preserving attribute, for carrying out the subsequent process.

The transference of outline points in step S8a are now explained hereinafter in detail by referring to FIG. 23. This figure shows skeleton points and outline points of the element corresponding to the "stretched" portion "ノ" of the Kanji character shown in FIG. 18 (the character shape skeleton data of the character "旭"). Here, the outline shape alteration data show that, when the line segment K3-K4 is transferred to the line segment K3'-K4', the outline points P5, P6, and P7 are objects of transference (since the number of the skeleton point to which the outline points P5, P6, and P7 belong is (K3)). The condition of the transference of the outline points P5 and P7 are as follows.

(1) The feet of the perpendiculars from the outline points P5 and P7 to the line segment K3-K4 become CP1 and CP2, respectively. The lengths of the line segments K3-CP1, CP1-CP2, and CP2-K4 are adjusted to be L1, L2, and L3, respectively. Here, the angle formed by the outline point P5, CP1, and K3 is angle A, and the angle formed by the outline point P7, CP2, and K3 is angle B.

The points CP1' and CP2' will be generated on the line segment K3'-K4' in proportion to the ratio L1:L2:L3 of the line segment K3-K4 (the skeleton point K3' is the same as the skeleton point K3). Here, the lengths of the line segments K3'-CP1', CP1'-CP2', and CP2'-K4' are assumed to be L1', L2', and L3', respectively.

(2) Assume the distances from the points P5 and P7 to the line segment K3-K4 to be D5 and D7, respectively, and the points P5 and P7 will be transferred to the points P5' and P7' away from the points CP1' and CP2' obtained in (1) in a direction perpendicular to the line segment K3'-K4' by the distances of D5 and D7, respectively. Here, the angle formed by the outline point P5', CP1', and K3' is now angle A', and the angle formed by the outline point P7', CP2', and K3' is now angle B'.

Figure 23:
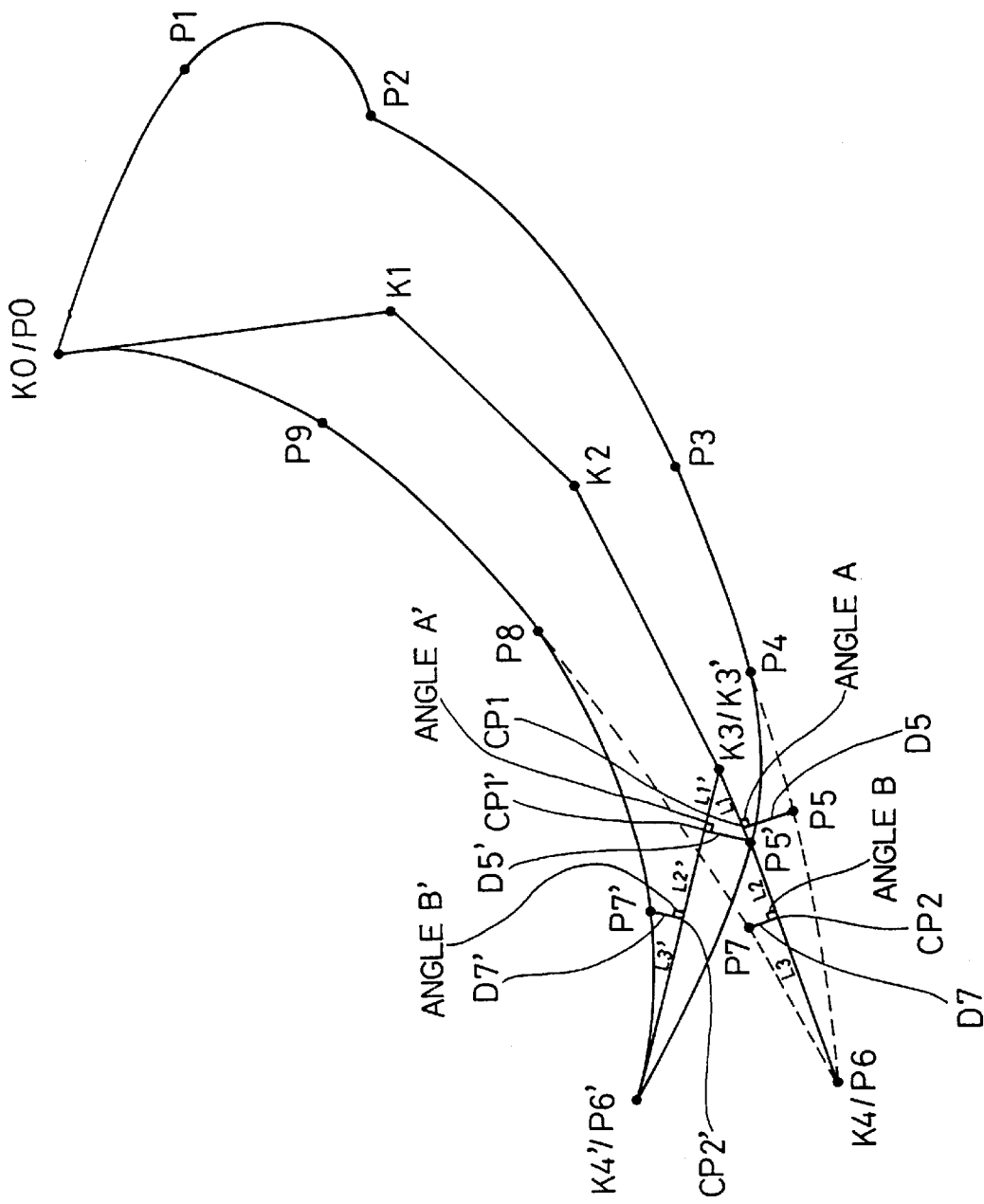
FIG. 23 is an explanatory view for showing the transference of outline points in the case of ordinary attribute according to embodiment 2 of the present invention.

Namely, in FIG. 23, the conditions for the transference of the points P5 and P7 are:

(a) the length ratio L1:L2:L3=L1':L2':L3', (b) the distance D5=D5' and the distance D7=D7', (c) the angle A=A'=90° and the angle B=B'=90°.

The outline point transferring process satisfying the above conditions (a), (b), and (c) makes it possible to alter the element outline shape in accordance with the character shape skeleton data. Here, though the condition for the transference of the outline point P6 is the same, the outline point P6 will be transferred to the outline point P6' which is the same point as the skeleton point K4' transferred from the skeleton point K4 because the outline point P6 has the same coordinate values as the skeleton point K4 in FIG. 23.

The transference of outline points in step S9a are now explained hereinafter in detail by referring to FIG. 24. This figure shows skeleton points and outline points of the element corresponding to the bent portion "ㄴ" of the lower-left radical "ㄴ" of the Kanji character shown in FIG. 18 (the character shape skeleton data of the character "旭"). However, in FIG. 24, the skeleton points and the outline points that are not directly relevant to the explanation have been omitted for simplicity with. Here, the outline shape alteration data show that, when the line segment K1-K2 is transferred to the line segment K1'-K2', the outline points P1 and P2 are an object of transference (since the number of the skeleton point to which the outline points P1 and P2 belong is (K1)). The condition of the transference of the outline points P1 and P2 are as follows.

(1) The feet of the perpendiculars from the outline points P1 and P2 to the line segment K1-K2 are adjusted to be CP1 and CP2, respectively. The distances K1-CP1, P1-CP1, CP2-K2, and P2-CP2 are defined by dx1, dy1, dx2, and dy2, respectively. Here, the angle formed by the outline point P1, CP1, and K1 is angle A, and the angle formed by the outline point P2, CP2, and K2 is angle B.

(2) From the skeleton points K1' and K2', the points CP1' and CP2' will be generated on the line segment K1'-K2' so that dx1=dx1' and dx2=dx2'. The points P1 and P2 will be transferred to the points P1' and P2' away from the points CP1' and CP2' in a direction perpendicular to the line segment K1'-K2' by the distances of dy1=dy1' and dy2=dy2', respectively. Here, the angle formed by the outline point P1', CP1', and K1' is now angle A', and the angle formed by the outline point P2', CP2', and K2' is now angle B'.

Figure 24:
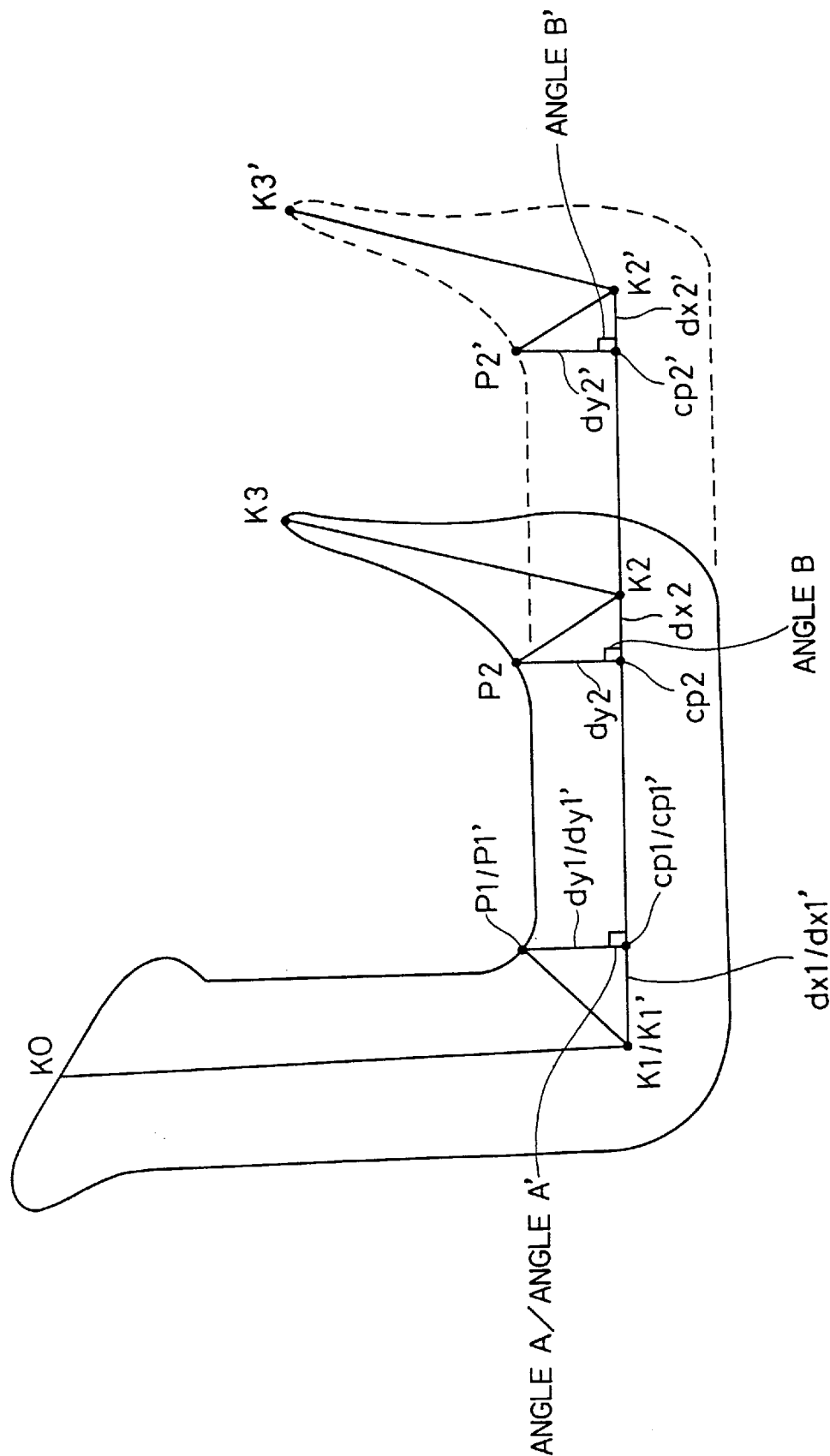
FIG. 24 is an explanatory view for showing the transference of outline points in the case of relative position preserving attribute according to embodiment 2 of the present invention.

Namely, in FIG. 24, the conditions for the transference of the points P1 and P2 are:

(a) the distance dx1=dx1' and dy1=dy1', (b) the distance dx2=dx2' and dy2=dy2', (c) the angle A=A'=90° and the angle B=B'=90°.

The outline point transferring process satisfying the above conditions (a), (b), and (c) makes it possible to alter the element outline shape in accordance with the character shape skeleton data.

The transference of outline points in step S10a is now explained hereinafter in detail by referring to FIG. 25. This figure shows skeleton points and outline points of the element corresponding to the squamous (scale-like) portion of the "stretched" portion "ノ" of the Kanji character shown in FIG. 18 (the character shape skeleton data of the character "旭." However, in FIG. 25, the skeleton points and the outline points that are not directly relevant to the explanation have been omitted for simplicity now. Here, the outline shape alteration data show that, when the line segment K0-K1 is transferred to the line segment K0'-K1', the outline points P0, P1, and P2 are objects of transference (since the number of the skeleton point to which the outline points P0, P1, and P2 belong is (K0)). The condition of the transference of the outline points P0, P1, and P2 are as follows.

(1) The X component and the Y component of the distances from the skeleton point K0 to the respective outline points P1 and P2 are defined by dx1, dy1, dx2, and dy2, respectively.

(2) From the skeleton points K0', the points P1' and P2' will be generated so that dx1=dx1', dy1=dy1', dx2=dx2', and dy2=dy2'.

Figure 25:
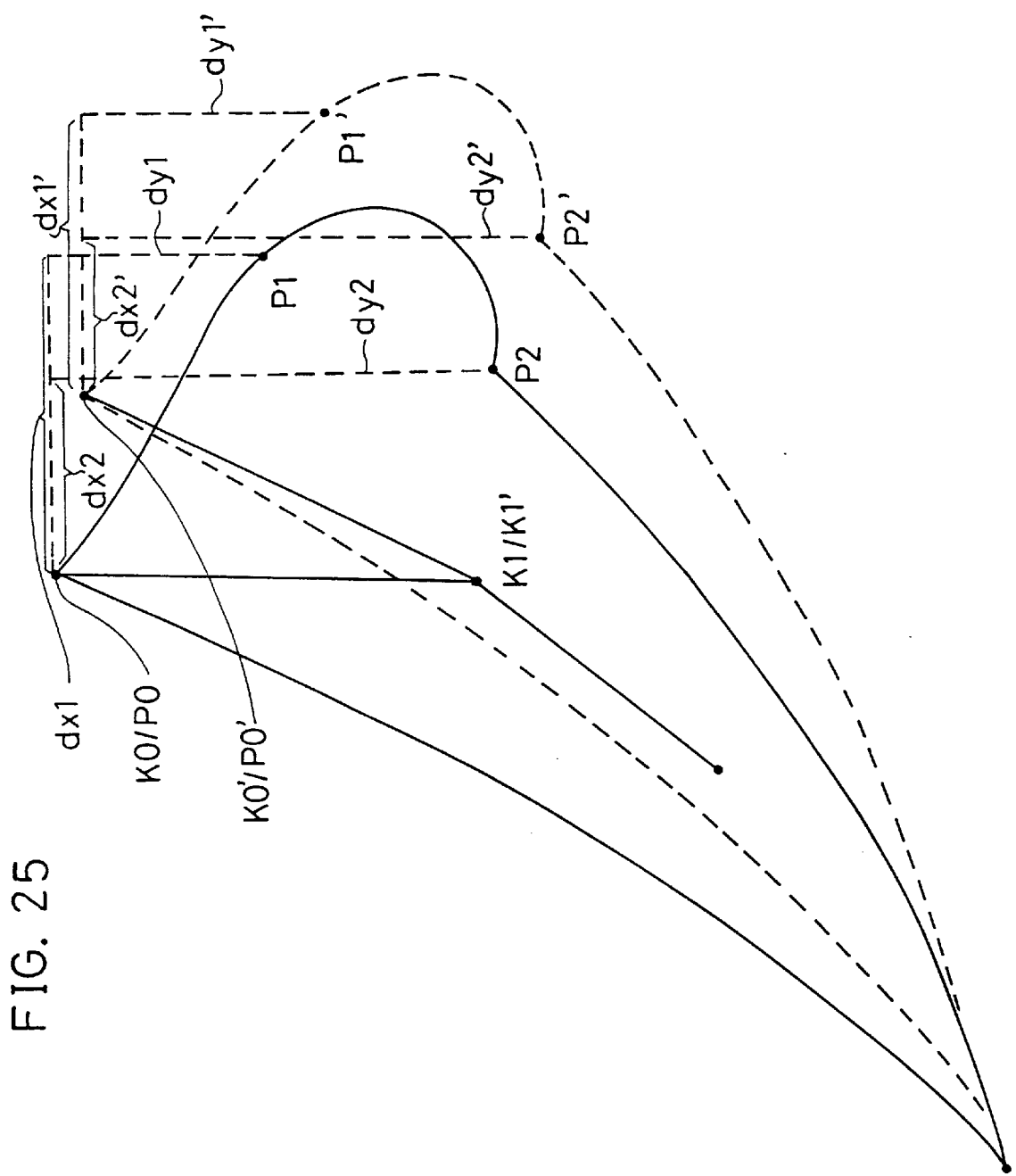
FIG. 25 is an explanatory view for showing the transference of outline points in the case of absolute position preserving attribute according to embodiment 2 of the present invention.

Namely, in FIG. 25, the conditions for the transference of the points P1 and P2 are:

(a) the distance dx1=dx1' and dy1=dy1',
(b) the distance dx2=dx2' and dy2=dy2'.

The outline point transferring process satisfying the above conditions (a) and (b) makes it possible to alter the element outline shape in accordance with the character shape skeleton data. Here, though the condition for the transference of the outline point P0 is the same, the outline point P0 will be transferred to the outline point P0' which is identical to the skeleton point K0' transferred from the skeleton point K0 because the outline point P0 has the same coordinate values as the skeleton point K0 in FIG. 25.

After the transferring process of all the outline points in the constituent element is finished (step S11a), the transferred outline points will be outputted to the output buffer of the main memory 13a (step S12a).

Further, in step S13a, the CPU 12a judges whether all the constituent elements in the character are processed or not. If the judgement is "Yes", the flow proceeds to step S14a, in which the data in the output buffer of the main memory 13a are sent to the bit map memory 14a to finish the process. If the judgement is "No", the flow goes back to step S3a so that the element pasting data and the skeleton point coordinate data of the next constituent element are taken in from the input buffer into the working memory within the CPU 12a.

The outline point data sent to the bit map memory 14a will be expanded into bit map data to be printed and outputted by the output device 15a such as a laser printer, a thermal printer, or the like.

In this way, the CPU 12a judges whether the deformation procedure code is an ordinary attribute, a relative position preserving attribute, or an absolute position preserving attribute. In accordance with the judgement, the outline points are transferred, the element outline shapes are altered, and the character pattern is then generated by using the altered outline shape data.

This makes it possible to develop a character style in a smaller number of steps because character patterns can be generated by only designing the element outline shapes representing the outlines of the constituent elements when compared with the prior art font development in which all the character patterns must be designed. Further, since the means for altering the element outline shapes is provided in the apparatus of the present invention, the element outline shapes can be used in common, making it possible to decrease the number of element outline shapes necessary for developing one character style.

Further, since the stroke length can be altered without changing the thickness of the stroke of the element outline portion, it is possible to generate a longitudinal bar, a lateral bar, a stretched curve, or the like with high quality in the character pattern after the outline shape is altered.

Moreover, since the distance and the angle of the outline points relative to the skeleton points can be preserved, it is possible to generate bent portions or the like with high quality in the character pattern after the outline shape is altered.

Also, since the distance of the outline points relative to the skeleton line segment can be preserved, it is possible to generate squamous (scale-like) portions or the like with high quality in the character pattern after the outline shape is altered.

According to the present invention, the character shape skeleton data, the element skeleton shape data, and the element outline shape data are stored in advance, and the CPU determines whether the process of altering the thickness is to be performed by calculation or by replacing the element with an alternative element if the thickness of the character is to be altered. In accordance with the determination, the thickness of the element outline shape is altered. Therefore, the shape of each element can be altered in the most suitable method depending on the element. This makes it possible to generate a thick or thin character pattern having an extremely high-quality with a comparatively small capacity.

Also, according to the present invention, the element skeleton shape data are altered in accordance with the character shape skeleton data; the alteration procedure determining section then determines the condition of transferring the outline points; and each of the outline points in the element outline shape data is transferred in accordance with the condition of transferring outline points as determined by the alteration procedure determining section. Therefore, each of the outline points in the element outline shape can be transferred by the most suitable method depending on the outline shape of the constituent element. This makes it possible to generate a character pattern having a high quality.

What we claim is:

1. A character pattern generating apparatus comprising:

a memory for pre-storing character shape skeleton data of character shapes, element shape skeleton data of skeleton shapes representing constituent elements of the characters for each character style, and element outline shape data of outline shapes representing constituent elements of the characters for each character style;

thickness determining means for determining whether a thickness of a character is to be altered from a designated thickness;

thickness alteration process determining means for determining whether the process of altering the thickness of each constituent element in the element outline shape data is performed by calculation, or by replacing the element with an alternative element when the character thickness is altered, so that the shape of each element may be altered by the most suitable method;

element outline thickness altering means for altering the thickness in the element outline shape data based on the determination by the thickness alteration process determining means;

element skeleton shape/element outline shape altering means for altering the element skeleton shape data based on the character shape skeleton data, and for subsequently altering the element outline shape data based on the altered element skeleton shape data; and generating means for generating a character pattern from the altered element outline shape data to provide a quality thick or thin character pattern using a relatively small capacity of memory.

2. An apparatus according to claim 1, wherein the character shape skeleton data includes (a) element pasting data for indicating the element outline shape data corresponding to the constituent elements and (b) thickness alteration process determining data required for determination of the process for altering the thickness of the constituent elements.

3. An apparatus according to claim 1, wherein the element outline shape data includes thickness alteration attribute data for the process of altering the element outline thickness.

4. An apparatus according to claim 1, wherein the element outline shape data for includes element outline shape alteration data for altering the element outline shape.

5. An apparatus according to claim 1, wherein the memory stores the character shape skeleton data, the element skeleton shape data, and the element outline shape data prior to subjecting each of the skeleton points in the element skeleton shape data to coordinate transformation by setting a Y coordinate to zero and altering the corresponding element outline shape data.

6. An apparatus according to claim 1, wherein the element outline thickness altering means alters the thickness of the element shape after determining, based on a thickness alteration attribute data, whether (a) an X coordinate is to be fixed and a Y coordinate is to be altered or (b) both X and Y coordinates are to be fixed for each of a plurality of outline points in the element outline shape data.

7. A character pattern generating apparatus comprising:
   a memory for pre-storing character shape skeleton data of character shapes, element skeleton shape data of skeleton shapes representing constituent elements of the characters for each character style, and element outline shape data of outline shapes representing constituent elements of the characters for each character style;
   element skeleton shape altering means for altering the element skeleton shape data based on the character shape skeleton data;
   alteration procedure determining means for determining a transfer condition of outline points;
   element outline shape altering means for transferring each of the outline points in the element outline shape data based on the transfer condition; and
   generating means for generating a character pattern from the altered element outline shape data.

8. An apparatus according to claim 7, wherein the element outline shape altering means transfers an outline point by fixing the distance between the outline point and a corresponding skeleton line, and by enlarging or diminishing the distance between the foot of a perpendicular and a corresponding skeleton point based on the alteration of the element skeleton, said perpendicular being a line drawn perpendicular to the skeleton line from the outline point.

9. An apparatus according to claim 7, wherein the element outline shape altering means transfers an outline point by fixing the distance between the outline point and a corresponding skeleton line, and by fixing the distance between the foot of a perpendicular and a corresponding skeleton point, the perpendicular being a line drawn perpendicular to the skeleton line from the outline point.

10. An apparatus according to claim 7, wherein the element outline shape altering means transfers an outline point by fixing the distance and angle between the outline point and a corresponding skeleton point.

11. A character pattern generator, comprising:
    a memory for pre-storing character shape skeleton data, element skeleton shape data and element outline shape data, said element skeleton shape and element outline shape data representing constituent elements of characters having a plurality of styles;
    a thickness determining section for determining whether a thickness of each constituent element in said element outline shape data is performed by calculation, or by replacing the element with an alternative element where the thickness of the character corresponding to each constituent element is altered, so that the shape of each element may be altered by the most suitable method;
    an element outline section for altering element outline shape data thickness based on said determination; and
    an output section for generating a character pattern from the altered element outline shape data to provide a quality thick or thin character pattern using a relatively small capacity of memory.

12. The character pattern generator according to claim 11, wherein the character shape skeleton data stored in said memory further includes:
    element pasting data for indicating element outline shape data corresponding to said constituent elements; and
    thickness alteration data required for altering the thickness of said constituent elements.

13. The character pattern generator according to claim 11, wherein the element outline shape data stored in said memory includes attribute data required for altering element outline thickness.

14. The character pattern generator according to claim 11, wherein the element outline shape data further includes element outline shape alteration data required for altering element outline shape.

15. The character pattern generator according to claim 11, wherein said element shape skeleton data includes a plurality of skeleton points, each of said plurality of skeleton points subjected to coordinate transformation in said memory by setting a Y-coordinate to zero and altering element outline shape data corresponding to said element shape skeleton data.

16. The character pattern generator according to claim 13, wherein said element outline section alters the thickness of an element outline shape after determining, based on said attribute data, whether an X-coordinate is to be fixed and a Y-coordinate is to be altered, or both X and y coordinates are to be fixed for each of a plurality of outline points in the element outline shape data.

17. A character pattern generator, comprising:
    a memory for pre-storing character shape skeleton data, element skeleton shape data and element outline shape data, said element skeleton shape and element outline shape data representing constituent elements of characters having a plurality of styles;
    a thickness determining section for determining whether a thickness of each constituent element in said element outline shape data is performed by calculation, or by replacing the element with an alternative element where the thickness of the character corresponding to each constituent element is altered, said element outline shape data thickness based on said determination, so that the shape of each element may be altered by the most suitable method;
    an element skeleton shape/outline shape section for altering said element skeleton shape data based on said character shape skeleton data, said element outline shape data being subsequently altered based on said element skeleton shape data; and
    an output section for generating a character pattern from the altered element outline shape data, thereby providing a quality thick or thin character pattern using a relatively small capacity of memory.

18. A method of generating a character pattern, comprising:
    pre-storing character shape skeleton data, element skeleton shape data and element outline shape data, said element skeleton shape and element outline shape data representing constituent elements of characters having a plurality of styles;
    altering said element skeleton shape data based on said character shape skeleton data;
    determining a transfer condition for transferring outline points of said element outline shape data;

transferring each of said outline points based on said transfer condition; and generating a character pattern from the transferred element outline shape data.

19. A method of generating a character pattern, comprising:

pre-storing character shape skeleton data, element skeleton shape data and element outline shape data, said element skeleton shape and element outline shape data representing constituent elements of characters having a plurality of styles;

determining whether a thickness of each constituent element in said element outline shape data is performed by calculation, or by a replacement of a constituent element with an alternative element where the thickness of the character corresponding to each constituent element is altered, so that the shape of each element may be altered by the most suitable method;

altering element outline shape data thickness based on the determination; and generating a character pattern from the altered element outline shape data, thereby providing a quality thick or thin character pattern with a relatively small capacity of memory.

20. A method of generating a character pattern, comprising:

pre-storing character shape skeleton data, element skeleton shape data and element outline shape data, said element skeleton shape and element outline shape data representing constituent elements of characters having a plurality of styles;

determining whether a thickness of each constituent element in said element outline shape data is performed by calculation, or by replacing the element with an alternative element where the thickness of the character corresponding to each constituent element is altered, said element outline shape data thickness based on said determination, so that the shape of each element may be altered by the most suitable method;

altering said element skeleton shape data based on said character shape skeleton data;

altering said element outline shape data based on said altered element skeleton shape data; and generating a character pattern from the altered element outline shape data, thereby providing a quality thick or thin character pattern using a relatively small capacity of memory.

* * * * *